United States Patent
Lacaze et al.

(10) Patent No.: US 12,319,259 B2
(45) Date of Patent: Jun. 3, 2025

(54) TRAILER ASSESSMENT SYSTEMS AND METHODS

(71) Applicant: Robotic Research OpCo, LLC, Clarksburg, MD (US)

(72) Inventors: Alberto Lacaze, Potomac, MD (US); Greg Ramsey, New Market, MD (US); Eric Meyer, Catonsville, MD (US); Justin Bungard, Gaithersburg, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

(21) Appl. No.: 18/850,733

(22) PCT Filed: Feb. 16, 2024

(86) PCT No.: PCT/US2024/016221
§ 371 (c)(1),
(2) Date: Sep. 25, 2024

(87) PCT Pub. No.: WO2024/173837
PCT Pub. Date: Aug. 22, 2024

(65) Prior Publication Data
US 2025/0108782 A1 Apr. 3, 2025

Related U.S. Application Data

(60) Provisional application No. 63/446,654, filed on Feb. 17, 2023.

(51) Int. Cl.
*B60T 7/20* (2006.01)
*B60T 8/17* (2006.01)
*B60W 40/10* (2012.01)

(52) U.S. Cl.
CPC .............. *B60T 7/20* (2013.01); *B60T 8/1708* (2013.01); *B60W 40/1005* (2013.01); *B60W 2300/12* (2013.01)

(58) Field of Classification Search
CPC .... B60T 7/20; B60T 8/1708; B60W 40/1005; B60W 2300/12
See application file for complete search history.

(56) References Cited

U.S. PATENT DOCUMENTS 8,108,117 B2  1/2012  Lingman et al.
9,162,612 B2  10/2015 Hanson et al.
(Continued)

FOREIGN PATENT DOCUMENTS

EP   1729104 A1    12/2006
EP   2570314 A1 *  3/2013  ............ B60T 13/263

OTHER PUBLICATIONS

International Search Report and Written Opinion, mailed Jun. 21, 2024, in International Application No. PCT/US24/16221. (11 pages).

*Primary Examiner* — Andrew J Cromer
(74) *Attorney, Agent, or Firm* — RowanTree Law Group, PLLC; Frederick F. Rosenberger

(57) ABSTRACT

A control system (202) can directly or indirectly measure force applied between a trailer (112) and a prime mover vehicle (102) coupled to the trailer. Based on the measured force, the control system can determine an operational state of one or more features of the trailer. For example, static resistance, rolling resistance, and/or acceleration rate of the trailer can be measured while applying a specific braking actuation level to the service air brakes of the trailer. Based at least in part on the measured static resistance, rolling resistance, and/or acceleration rate, an operational model (206) for actuation of the service air brakes can be applied.

(Continued)

In some examples, the control system can be part of the prime mover vehicle, for example, an autonomous vehicle.

20 Claims, 8 Drawing Sheets

(56) References Cited

U.S. PATENT DOCUMENTS

| | | |
|---|---|---|
| 9,207,135 B2 | 12/2015 | Staufer et al. |
| 2016/0257341 A1 | 9/2016 | Lavoie et al. |
| 2021/0139008 A1 | 5/2021 | DiGioacchino et al. |
| 2021/0370922 A1 | 12/2021 | Smith |

* cited by examiner

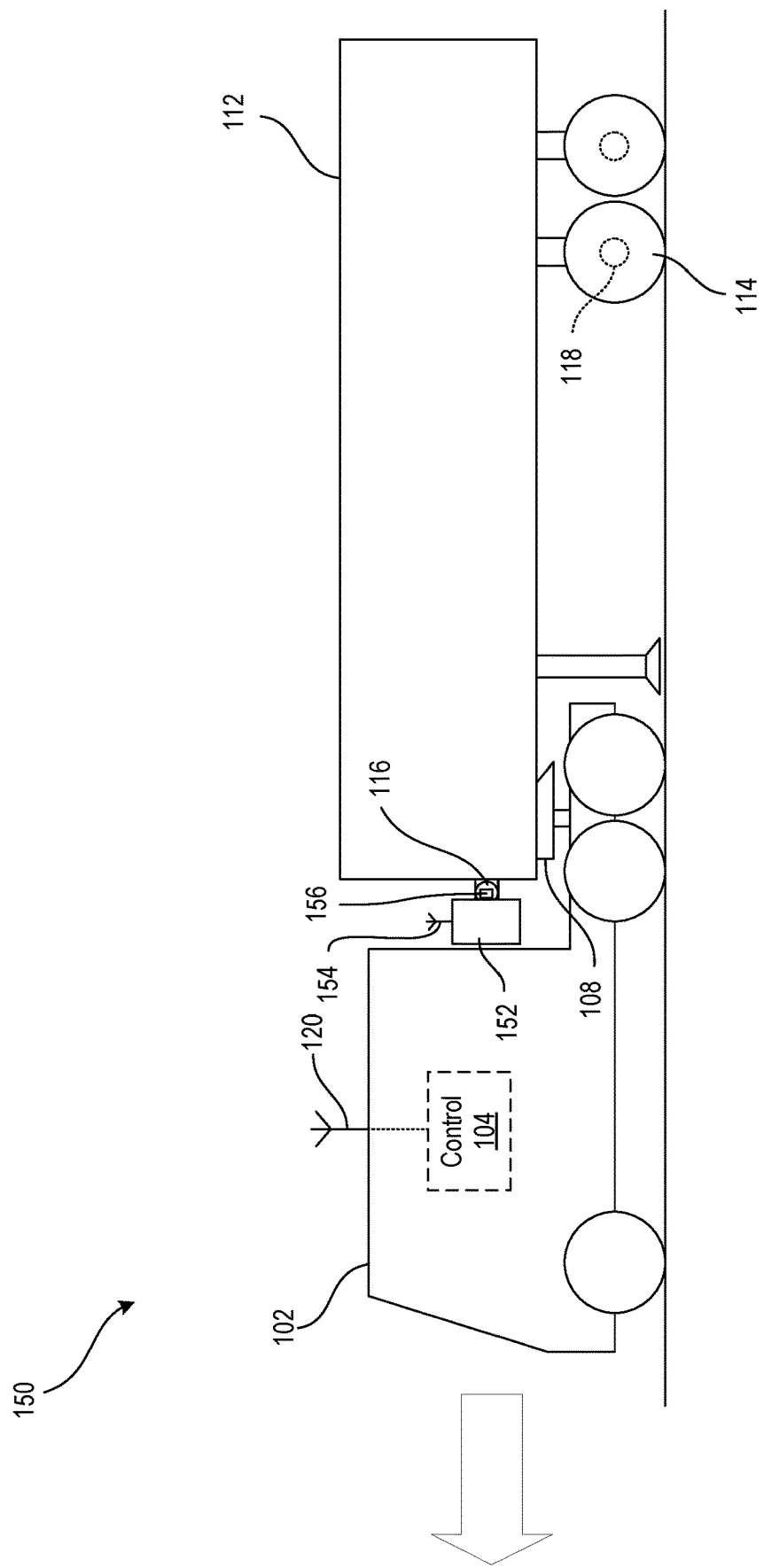

TRAILER ASSESSMENT SYSTEMS AND METHODS

CROSS-REFERENCE TO RELATED APPLICATION(S)

This application claims benefit of and priority under 35 U.S.C. § 119 (e) to and is a non-provisional of U.S. Provisional Patent Application No. 63/446,654, filed on Feb. 17, 2023 and entitled "Trailer Assessment Systems and Methods," which is hereby incorporated by reference herein in its entirety.

FIELD

The present disclosure relates generally to tractor-trailer systems, and more particularly, to assessing the condition of one or more features of a semi-trailer system, for example, condition and/or operation of the pneumatic brakes of the trailer.

BACKGROUND

An 18-wheeler or tractor-trailer truck includes a semi-trailer (also referred to herein as "trailer") releasably coupled to a tractor (also referred to herein as "truck"). At distribution centers, marine terminals, rail heads, etc., the trailer is often disconnected from the truck, for example, for cargo loading, cargo unloading, storage, or changing between trucks. In some cases, the trailer may sit idle for an extended period of time (e.g., days or weeks) until it is connected to another truck for transport from a parked location (e.g., within a yard or lot) or to a local vehicle (e.g., hostler) for transport around a yard or lot. The new truck or local vehicle may thus be unfamiliar with the quality or characteristics of the trailer. For example, there may be concerns with respect to integrity of the brakes of the trailer, but compromised braking function may not otherwise be apparent to the new truck or local vehicle until such braking function is required, which could lead to catastrophic failure. Embodiments of the disclosed subject matter may address one or more of the above-noted problems and disadvantages, among other things.

SUMMARY

Embodiments of the disclosed subject matter provide systems and methods of assessing a trailer prior to or during movement by a towing vehicle (e.g., a prime mover vehicle, such as a tractor or hostler). In some embodiments, the assessment of the trailer includes determining brake actuation levels (e.g., air pressure) from the towing vehicle to the trailer to provide a desired braking force. For example, the determination of brake actuation levels can include building a model based at least in part on measured data and/or compiling a table based at least in part on measured data that is used as input to a feed forward control algorithm. Alternatively or additionally, in some embodiments, the assessment of the trailer can include determining the health or integrity of emergency brakes of the trailer. Alternatively or additionally, in some embodiments, the assessment of the trailer can include evaluating features (e.g., collectively) that impact kinematics of the trailer, for example, wear condition of wheel bearings, tire inflation, trailer drag, etc. In some embodiments, the data measured for assessing the trailer can include (i) static resistance of the trailer, (ii) rolling resistance of the trailer, (iii) acceleration (e.g., deceleration) rate of the trailer, (iv) forces applied between the trailer and the towing vehicle, (v) weight of the trailer, (vi) power applied, torque applied, and/or energy used by motor(s) of the towing vehicle, or (vii) any combination of (i)-(vi).

In one or more embodiments, a control system can comprise one or more processors and one or more non-transitory computer-readable media storing computer-readable instructions. When executed by the one or more processors, the computer-readable instructions can cause the one or more processors to (a) measure static resistance and rolling resistance of a trailer without application of any braking force by service air brakes and emergency air brakes of the trailer; (b) apply an actuation level to the service air brakes of the trailer while releasing the emergency air brakes of the trailer; (c) measure static resistance, rolling resistance, and/or acceleration rate of the trailer during (b); and (d) determine an operational model for actuation of the service air brakes of the trailer based at least in part on the measured static resistances, rolling resistances, and/or acceleration rate.

In one or more embodiments, an autonomous vehicle can comprise a fifth-wheel coupling, a drive-by-wire kit, one or more motors, one or more sensors, and a vehicle control system. The fifth-wheel coupling can be configured to be coupled to a trailer. The one or more sensors can be configured to detect features in an environment surrounding the vehicle, forces applied to the vehicle, and/or forces applied to the trailer. The vehicle control system can be operatively coupled to the drive-by-wire kit, the one or more motors, and the one or more sensors. The vehicle control system can comprise one or more processors and one or more non-transitory computer-readable media storing computer-readable instructions. When executed by the one or more processors, the computer-readable instructions can cause the one or more processors to (a) apply an actuation level to the service air brakes of the trailer while releasing the emergency air brakes of the trailer; (b) measure static resistance, rolling resistance, and/or acceleration rate of the trailer during (a); and (c) determine an operational model for actuation of the service air brakes of the trailer based at least in part on the static resistances, rolling resistances, and/or acceleration rate measured in (b).

In one or more embodiments, a method can comprise (a) applying an actuation level to service air brakes of a trailer while releasing emergency air brakes of the trailer. The method can further comprise (b) measuring static resistance, rolling resistance, and/or acceleration rate of the trailer during (a). The method can also comprise (c) repeating (a) and (b) one or more times at different actuation levels. The method can further comprise (d) determining an operational model for actuation of the service air brakes of the trailer based at least in part on the measured static resistances, rolling resistances, and/or acceleration rates.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. Throughout the figures, like reference numerals denote like elements. An understanding of embodiments described herein and many of the attendant advantages thereof may be readily obtained by reference to the following detailed description when considered with the accompanying drawings, wherein:

FIGS. 1A-1B illustrate aspects of brake control of a trailer by a towing vehicle, according to one or more embodiments of the disclosed subject matter;

DETAILED DESCRIPTION

I. Introduction

Disclosed herein are systems and methods for assessment of a trailer coupled to a towing vehicle (e.g., a prime mover vehicle, such as a tractor). In some embodiments, the towing vehicle is an autonomous truck or vehicle, for example, a yard hostler, such as but not limited to those vehicles disclosed in International Publication No. WO 2023/212044, published Nov. 2, 2023, and entitled "Autonomous Gladhands Coupling Systems, Devices, and Methods," which vehicles are hereby incorporated by reference herein. In some embodiments, the assessment of the trailer can be in situ, for example, during movement and/or attempted movement of the trailer by the towing vehicle.

Figure 1A:
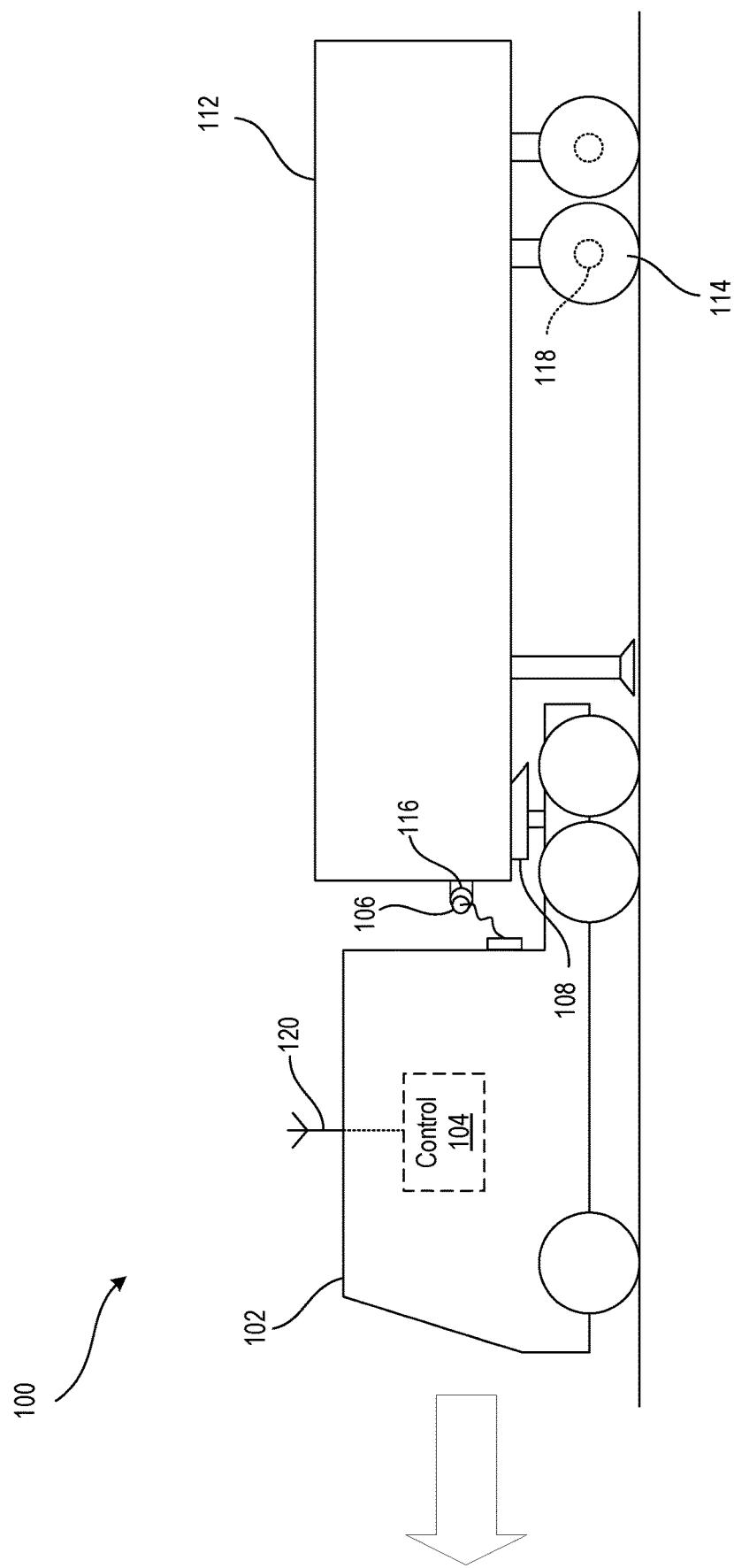

In some embodiments, the operation of the brakes of the trailer (e.g., the actuation level of the service brakes and/or release of the emergency brakes) can be controlled by the towing vehicle, for example, via one or more gladhand couplers. For example, FIG. 1A illustrates a tractor-trailer system 100 that includes a towing vehicle 102 (an autonomous or semi-autonomous vehicle) connected to a trailer 112 via fifth-wheel coupling 108. The vehicle 102 can have one or more gladhand couplers or connectors 106 that connect, mate, and/or interface with a corresponding gladhand receptacle 116 of the trailer 112, for example, to allow pressurized air from the vehicle 102 to pressurize the pneumatic supply lines of the trailer braking system and/or to control engagement of the trailer service brakes (or disengagement of the trailer emergency brakes).

In some embodiments, operation of the vehicle 102 and/or operation of the brakes of the trailer 112 can be controlled by a control system 104 of the vehicle 102. Alternatively or additionally, in some embodiments, the control system 104 can be configured to perform an assessment of the trailer 112. For example, motive features (e.g., operability of the trailer brakes, regulation of the service brakes, condition of ball bearings 118, inflation of tires 114, etc.) of the trailer 112 can be assessed by the control system 104 as the vehicle 102 tows or attempts to tow the trailer 112. In the illustrated example, the control system 104 is mounted on or located within the vehicle 102. Alternatively, in some embodiments, some or all of control system 104 can be located outside of vehicle 102, for example, one or more control modules remote from the vehicle 102 (e.g., a centralized control system for a yard in which the vehicle 102 operates). The vehicle 102 (or the control system thereof) can communicate with other vehicles and/or a centralized control system, for example, using antenna 120.

In some embodiments, operation of the brakes of the trailer can be controlled via a remote control unit. For example, FIG. 1B illustrates another tractor-trailer system 150 that employs a remote control unit 152 for controlling operation of the brakes of the trailer 112. In the illustrated example, the remote control unit 152 can have one or more gladhand couplers or connectors 156 that connect, mate, and/or interface with a corresponding gladhand receptacle 116 of the trailer 112. In some embodiments, control system 104 can control operation of the remote control unit 152, for example, via wireless signal (e.g., via radio, ultra-wideband (UWB), Bluetooth, Wi-Fi, cellular, optical, or any other wireless communication protocol) from antenna 120 to antenna 154 (e.g., receiver or transceiver) of the remote control unit 152.

The remote control unit 152 can disengage the emergency brakes of the trailer 112 in order allow movement by vehicle 102 without having to manually connect its gladhand connector to the trailer. In some embodiments, a human user or operator can manually connect the remote control unit 152 to the gladhand receptacle 116 of the trailer 112. For example, a driver of the vehicle 102, a lot attendant overseeing or coordinating operations where the trailer 112 has been parked, or any other person can manually connect the remote control unit 152 to the trailer 112, for example, prior to or during first connection with vehicle 102.

In some embodiments, the remote control until 152 and the control system 104 can be capable of two-way communication, for example, such that the control system 104 can receive status information (e.g., parking brake engaged versus disengaged, braking system pressure, charge status or power level of the remote unit 152, location of the remote unit 152, trailer braking system type, etc.) from the remote unit 152. In some embodiments, the remote control unit 152 can include multiple connections to pressurize the trailer braking system to disengage the parking brake, thereby allowing the trailer 112 to be moved, and to control application of the service brakes. For example, the connection to the service braking line can be used by the control system 104 to provide supplemental braking via the trailer 112 during movement by vehicle 102.

In some embodiments, the assessment of the trailer can include testing operation of the brakes of the trailer, for example, the service brakes, the emergency brakes, or both. For example, the vehicle coupled to the trailer can independently control the brakes of the trailer (separate from or in addition to the brakes of the vehicle) as the vehicle is towing (or attempting to tow) the trailer in order to determine if the brakes are operational. Alternatively or additionally, the assessment of the trailer can include determining regulation of the brakes for the trailer, for example, the service brakes, the emergency brakes, or both. For example, the vehicle coupled to the trailer can control the brakes of the trailer to apply a predetermined or desired braking force, and the vehicle can measure the resulting braking force. Alternatively or additionally, the assessment of the trailer can include evaluating another motive feature of the trailer, for example, a wear condition of one or more ball bearings, an inflation level of one or more tires, and/or any other feature that would affect drivability of the trailer.

In some embodiments, the assessment of the trailer can be based on a weight of the trailer. In some embodiments, the weight of the trailer can be calculated or at least estimated, for example, based on imaging (e.g., visual imagery, LIDAR, etc.), mechanics calculations (e.g., based on measured acceleration using Newton's second law of motion), or any other methodology. Alternatively or additionally, the weight of the trailer can be measured, for example, via a truck scale. Alternatively or additionally, the weight of the trailer may be known (e.g., from a previous measurement or calculation), for example, stored in a database accessible for use in the assessment.

In some embodiments, the assessment of the trailer can be based on a measured force between the trailer and the coupled vehicle. For example, in some embodiments, the assessment can include comparing a tractive effort of the vehicle with different actuation levels (e.g., applied pressured) the trailer service brakes. In some embodiments, one or more sensors can be used to measure the force applied by the vehicle to the trailer. Alternatively or additionally, in some embodiments, the measured force can be determined based on motor operation of the vehicle (e.g., power or current input to the motor, revolutions per minute (RPM) of the motor, power or torque output by the motor, energy consumed by the motor, etc.) during towing or attempted towing of the trailer by the vehicle.

II. Trailer Assessment

Figure 2A:
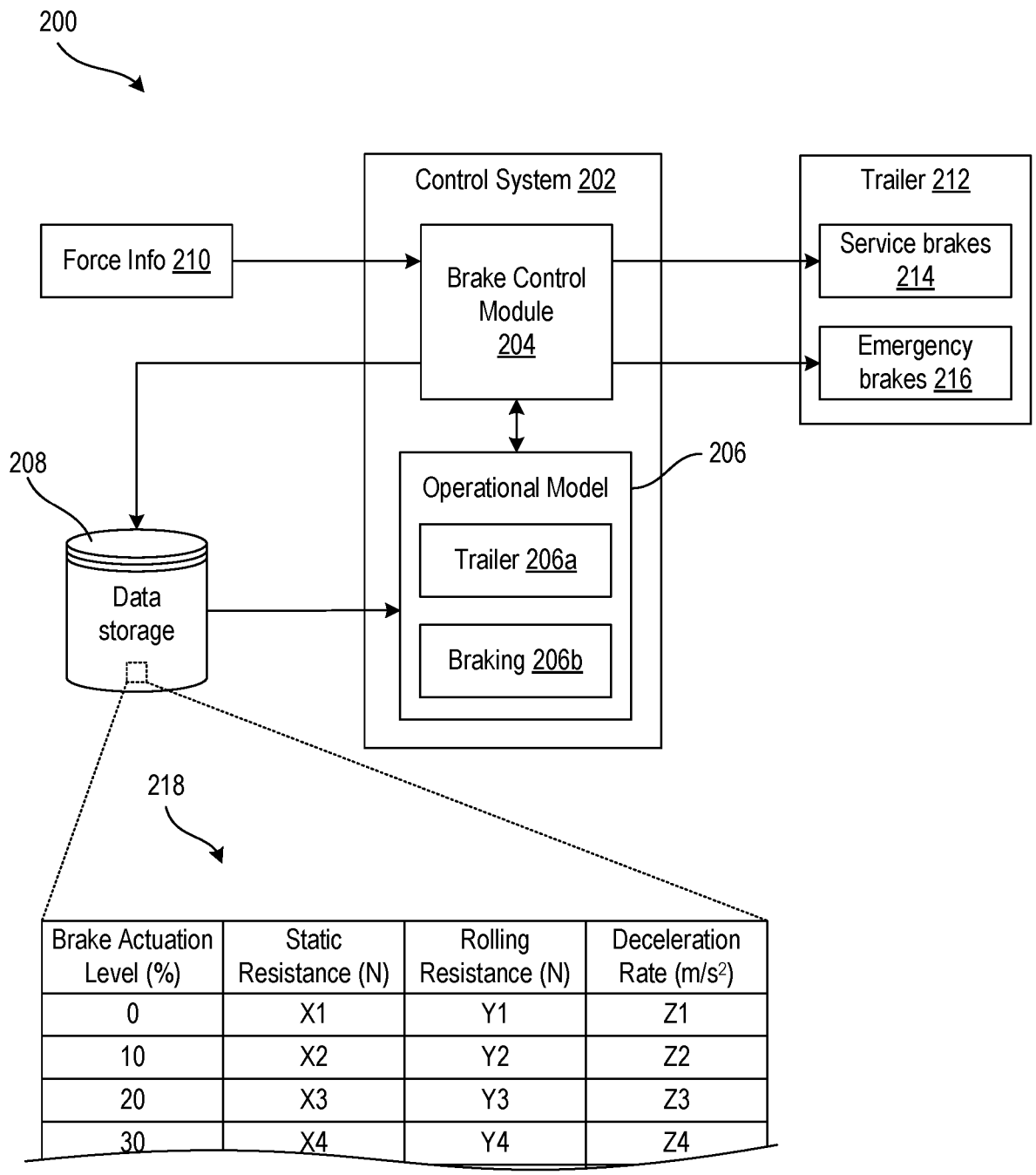
FIG. 2A illustrates aspects of a configuration for trailer assessment, according to one or more embodiments of the disclosed subject matter.

FIG. 2A shows a simplified configuration 200 of components for assessment of a trailer. In the illustrated example, the configuration 200 includes a control system 202 and a trailer 212 (e.g., a trailer undergoing assessment and/or towing). In some embodiments, the control system 202 is part of (e.g., integrated or communicating with a vehicle control system) or at least mounted on or in a towing vehicle (e.g., a prime mover vehicle, such as a truck or hosteler). Alternatively, in some embodiments, the control system 202 is remote from and in communication with (e.g., wireless communication) the towing vehicle, for example, a yard control system, a central fleet control system, or any other type of remote station.

In the illustrated example, the control system 202 is in communication (e.g., wired or wireless) with a data storage device 208 (e.g., database). In some embodiments, the data storage device 208 can be part of or at least mounted on or in the towing vehicle. Alternatively, in some embodiments, the data storage device 208 can be remote from the control system 202 and/or the towing vehicle. In the illustrated example, the data storage device 208 stores information obtained during assessment of the trailer 212. In some embodiments, the data storage device 208 can store other information, such as but not limited to rules or protocols for performing an assessment of the trailer, other information regarding trailer 212 (e.g., not otherwise obtained by the assessment, such as trailer weight, contents, identifier, etc.), information regarding other trailers (e.g., obtained by control system 202 or other control systems by a prior assessment), rules of the road (e.g., when data storage device 208 is shared with the vehicle control system), docking locations, road or travel path network information, etc.

Figure 2B:
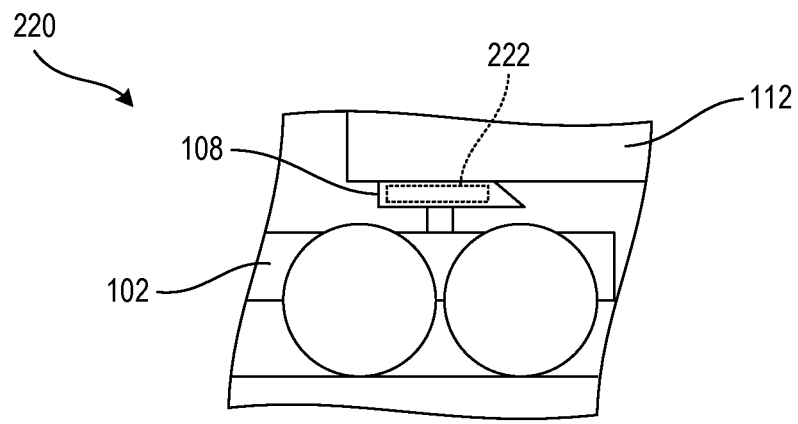
FIG. 2B illustrates aspects of a configuration for force measurement using sensor(s) on a fifth-wheel coupling, according to one or more embodiments of the disclosed subject matter.

In the illustrated example, the control system 202 is in communication (e.g., wired or wireless) with a source of force information 210. In some embodiments, the force information source 210 can be part of or at least mounted on or in the towing vehicle. For example, the force information source 210 can be a force sensor 222 mounted on or integrated with the fifth-wheel coupling 108 that measures the force between the towing vehicle 102 and the trailer 112, as shown by the sensor configuration 220 of FIG. 2B. In the illustrated example of FIG. 2B, the force sensor 222 can be a strain gauge; however, other force measurement sensors (and corresponding configurations) are also possible according to one or more contemplated embodiments, such as but not limited to load cells, accelerometers, pressure sensors, torque sensors, etc.

Alternatively or additionally, in some embodiments, the force information source 210 can be part of the existing vehicle infrastructure, for example, the vehicle control system or other component providing information regarding motor performance (e.g., power or torque applied by the motor, revolutions per minute of the motor, energy used by the motor, power or current applied to an electric motor, etc.) that can be used as a proxy for forces between the towing vehicle and the trailer. Alternatively or additionally, in some embodiments, the force information source 210 can be remote from the towing vehicle, for example, a force sensor that is mounted on or integrated with the trailer (e.g., the kingpin of the trailer). Alternatively or additionally, in some embodiments, the force information source 210 can be used to estimate or determine other characteristics of the trailer 212, for example, a weight of the trailer.

In the illustrated example of FIG. 2A, the control system 202 includes a brake control module 204 that controls actuation of the service air brakes 214 and the emergency air brakes 216 of the trailer, for example, by applying air pressure to the respective trailer brake lines. In some embodiments, air pressure is supplied from the towing vehicle via pneumatic lines connected to respective gladhand receptacles on the trailer by gladhand couplings, and the brake control module 204 (whether located on or remote from the towing vehicle) can control application of the air pressure to provide desired trailer braking (e.g., a particular braking force for the service air brakes, complete release of the emergency air brakes, etc.). Alternatively, in some embodiments, air pressure is supplied via one or more remote control units connected to the trailer gladhand receptacles, and the brake control module 204 (whether located on or remote from the towing vehicle) can send command signals to the remote control unit(s) to generate and/or apply air pressure to provide desired trailer braking.

In the illustrated example of FIG. 2A, the control system 202 further includes an operational model 206, which can include a model of or information on trailer kinematics 206a and a model of or information on trailer braking 206b. In some embodiments, the trailer kinematic model/information 206a can capture or be based on trailer wheel bearing conditions, trailer tire inflation, trailer drag, and/or any other trailer feature that may affect its movement. In some embodiments, the trailer braking model/information 206b can capture or be based on trailer braking at different actuation levels (e.g., air pressure applied). For example, in some embodiments, the operational model 206 can be a control algorithm (e.g., a feed forward control algorithm) that takes in previously determined trailer assessment data (e.g., via data storage device 208) and outputs an actuation level (e.g., to brake control module 204, for use in controlling trailer brakes 214, 216) to achieve a desired braking performance.

For example, in some embodiments, after the assessment and while moving the trailer 212 via the towing vehicle (e.g., the same vehicle used to perform the assessment, or a different vehicle), the control system 202 can determine that a desired braking performance is needed for the trailer 212 (e.g., to stop within a certain distance, to reduce to a particular speed, etc.), and brake control module 204 can interface with the operational model 206 to select an appropriate brake actuation level to achieve the desired performance. The selected brake actuation level can then be commanded (e.g., sent or applied) to the service brakes 214 of the trailer 212 via the brake control module 204. The determination of desired braking performance and selection/command of brake actuation level can be repeated on a continuous or periodic basis, for example, to account for dynamic or changing operating conditions (e.g., a new obstacle requiring greater braking, changes in road conditions, changes in motor performance, etc.).

In some embodiments, the previously determined trailer assessment data can be in the form of data structure, such as data table 218. For example, the data table 218 can include data measured (e.g., by the force information source 210, by the control system 202, by sensors of the towing vehicle or trailer, or by any other system) during movement or attempted movement of the trailer 212 at different brake actuation levels (e.g., as a percentage of maximum pressure available in the air braking system, for example, 100-120 psi). In some embodiments, the static resistance of the trailer (e.g., the amount of force needed to initiate movement of the trailer when at rest), the rolling resistance of the trailer (e.g., the amount of force needed to maintain movement of the trailer), and/or the acceleration rate (e.g., either positive (increasing speed) or negative (decreasing speed) can be measured for a given brake actuation level. In some embodiments, other data can be measured (simultaneously or at a different time) and included in data table 218 as well. For example, the other data can include but is not limited to measured force between the trailer and the towing vehicle (e.g., during acceleration rate measurements), force or power applied by the towing vehicle (e.g., during static and/or rolling resistance measurements), etc.

For example, in some embodiments, the static resistance can be measured by slowly increasing the speed or power of the towing vehicle until the trailer begins to move, and/or the rolling resistance of the trailer can be measured while the trailer is moved along a straight, flat roadway at constant speed. In some embodiments, the difference between the rolling resistance and the static resistance (e.g., at zero brake actuation level) can provide information regarding trailer kinematics (e.g., trailer wheel bearing conditions, trailer tire inflation, trailer drag, and/or any other trailer feature that may affect its movement), which can serve as a basis for trailer kinematic model/information 206a. For example, in some embodiments, the acceleration rate can be measured by moving the trailer 212 at a constant speed, applying a brake actuation level to the trailer brakes, and measuring a time and/or distance until the trailer 212 stops (or reaches a predetermined slower speed). In some embodiments, the acceleration rate can provide information regarding trailer braking, which can serve as a basis for trailer braking model/information 206b. For example, in some embodiments, the acceleration rate can be correlated with trailer braking force using Newton's second law of motion (e.g., force=mass×acceleration) and a weight of the trailer (e.g., measured or estimated).

In the illustrated example of FIG. 2A, different brake actuation levels are shown. However, other brake actuation levels for assessment are also possible, and/or not every brake actuation level needs to be assessed. For example, in some embodiments, assessments can be performed at one or more different brake actuation levels (e.g., 0%, 50%, and 100%), and the results extrapolated (e.g., interpolated) for other brake actuation levels. In addition, although data table 218 shows measurements for each different variable (e.g., static resistance, rolling resistance, and acceleration rate) at each brake actuation level, embodiments of the disclosed subject matter are not limited thereto. Rather, in some embodiments, less than all of the variables (e.g., a subset of one or more) can be measured at a particular brake actuation level. For example, in some embodiments, only the static resistance and rolling resistance (e.g., without assessing acceleration rate) may be measured for the 0% brake actuation level, while only the acceleration rate (e.g., without assessing static and rolling resistance) may be measured for brake actuation levels greater than 0%.

III. Trailer Weight

As referenced above, in some embodiments, the acceleration rate measured for a particular brake actuation level can be correlated with trailer braking force using Newton's second law of motion and a weight of the trailer. In some embodiments, the system performing the correlation can account for other factors affecting the acceleration, such as but not limited to the trailer rolling resistance, the braking force (if any) applied by the towing vehicle, the towing vehicle rolling resistance, the weight of the towing vehicle, etc. In some embodiments, the weight of the trailer can be known (e.g., stored in a database, based on cargo, etc.) and/or previously measured (e.g., via a weigh station or scale).

Alternatively or additionally, in some embodiments, the weight of the trailer can be estimated based on interactions between the towing vehicle and the trailer. For example, in some embodiments, the towing vehicle can include one or more sensors that measure a vertical force applied to the fifth-wheel coupling by the trailer (e.g., when the fifth-wheel coupling is brought into contact with the trailer at the time of first coupling to the towing vehicle). The vertical force measured when lifting the front end of the trailer during the coupling can provide an estimate of the weight of the trailer, for example, by using the characteristics of the trailer (e.g., the distance between the kingpin and the rear tires) and classical mechanics (e.g., summation of moments).

Figure 3A:
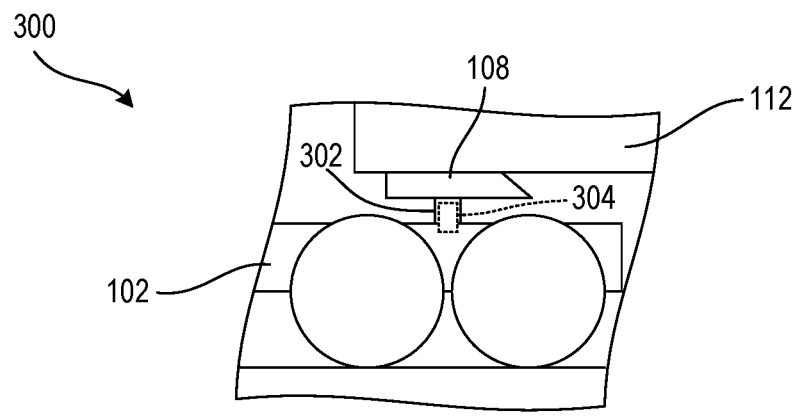
FIGS. 3A-3B illustrate aspects of configurations of sensor(s) on fifth-wheel couplings for use in trailer weight estimation, according to one or more embodiments of the disclosed subject matter.
Figure 3B:
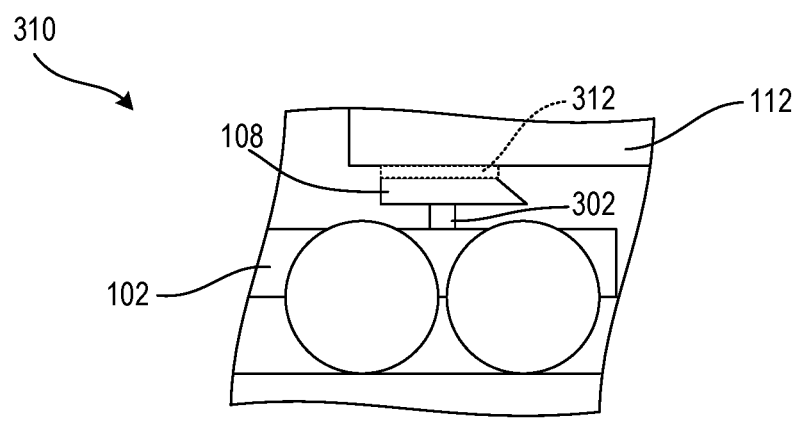

For example, FIG. 3A shows a sensor configuration 300 employing a force sensor 304 (e.g., pressure sensor) on the hydraulic lift 302 of fifth-wheel coupling 108. As the fifth-wheel coupling 108 is raised into contact with and lifts the front end of trailer 112, the force sensor 304 can measure the amount of pressure applied by hydraulic lift 302, which measurement can be used to estimate the weight of the trailer. Alternatively, a pressure plate 312 disposed between a top surface of the fifth-wheel coupling 108 and a facing surface of the trailer 112 can be used to measure the amount of pressure as the fifth-wheel coupling 108 is raised into contact with and lifts the front end of trailer 112, as shown by sensor configuration 310 in FIG. 3B. Other sensors and/or sensor configurations for measuring the vertical force between the trailer and towing vehicle are also possible according to one or more contemplated embodiments.

Figure 3C:
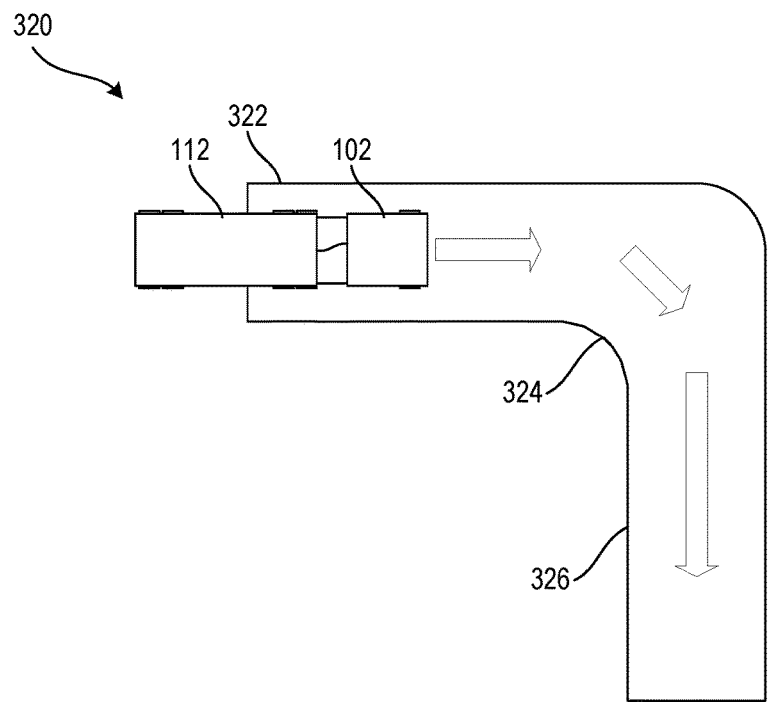
FIGS. 3C-3D illustrate aspects of path following by the towing vehicle and trailer for use in trailer weight estimation, according to one or more embodiments of the disclosed subject matter.
Figure 3D:
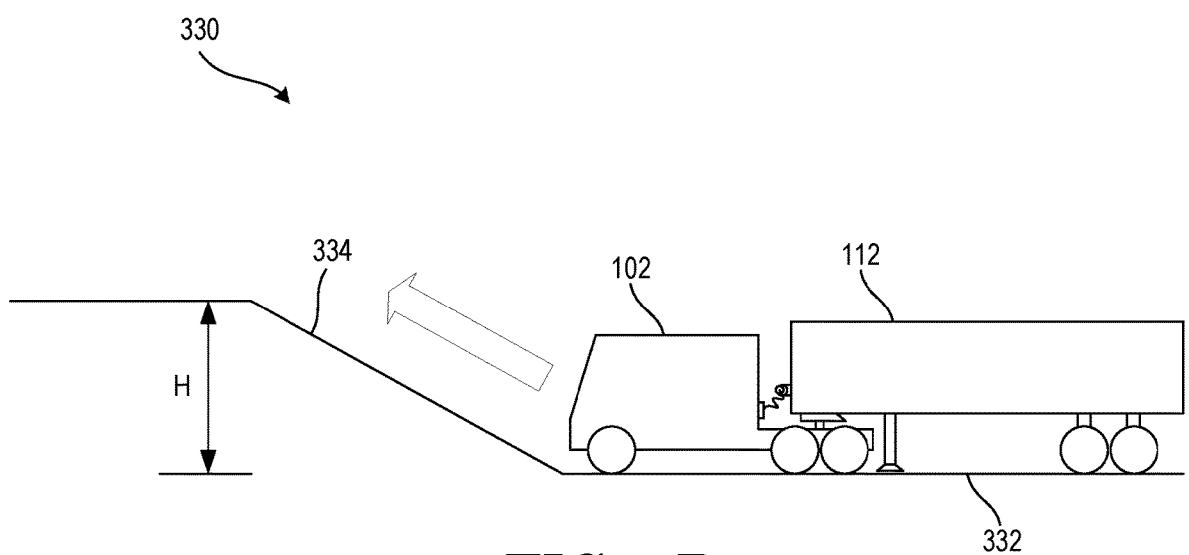

Alternatively or additionally, in some embodiments, the movement of the trailer by the towing vehicle along one or more known or predetermined routes can be used to estimate trailer weight. In some embodiments, the trailer 112 can be moved by towing vehicle 102 along a particular path 322, for example, as shown by the scenario 320 of FIG. 3C. In the illustrated example, the path 322 includes a turn 324 and a straightaway 326; however, other path configurations are also possible according to one or more contemplated embodiments. The forces between the towing vehicle 102 and the trailer 112 can be measured during the movement, for example, using a sensor on the kingpin or fifth-wheel coupling (e.g., using the sensor configuration of FIG. 2B). The measured forces can be used to estimate the mass of the trailer, for example, using Newton's second law of motion. Alternatively or additionally, the trailer 112 can be moved by towing vehicle 102 to a different height (H), for example, from an initial lower level 332 up a hill, ramp, or other inclined feature 334 to a higher level, as shown by the scenario 330 of FIG. 3D. The energy expended by the towing vehicle 102 in moving the trailer 112 to the raised height can be used to estimate the weight of the trailer 112 based on the change in potential energy (e.g., using conservation of energy principles, and accounting for energy loss due to rolling resistance).

IV. Assessment Method Examples

Figure 4:
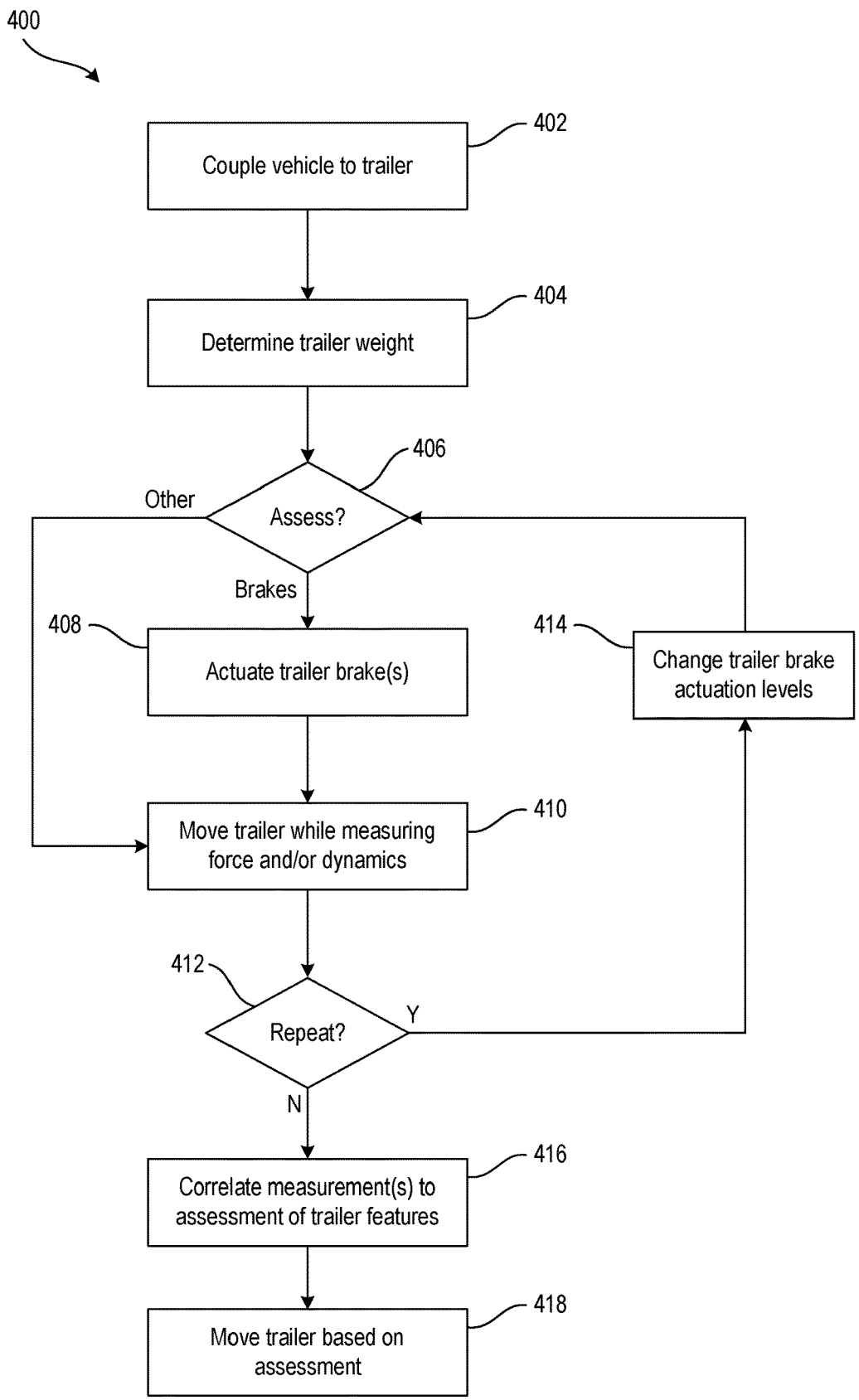
FIG. 4 is a simplified process flow diagram of a trailer assessment method, according to one or more embodiments of the disclosed subject matter.

FIG. 4 shows a method 400 for assessing and moving a trailer. The method 400 can begin at process block 402, where a towing vehicle (e.g., an autonomous tractor or trucks, such as a yard hostler) can be coupled to the trailer, for example, by engaging and locking the fifth-wheel coupling of the vehicle with the kingpin of the trailer. In some embodiments, the coupling of process block 402 can include connecting one or more gladhand couplers of the vehicle to the respective gladhand receptacles of the trailer. Alternatively or additionally, in some embodiments, the coupling of process block 402 can include connecting a remote control unit to the respective gladhand receptacle of the trailer.

The method 400 can optionally proceed to process block 404, where a weight of the trailer can be determined. In some embodiments the weight determination of process block 404 can include calculating or at least estimating a weight of the trailer based at least in part on data or signals from one or more sensors (e.g., force sensor, visual imaging, LIDAR, etc.). Alternatively or additionally, in some embodiments, the weight determination of process block 404 can include measuring the weight of the trailer, for example, via a truck scale. Alternatively or additionally, in some embodiments, the weight determination of process block 404 can include accessing, downloading, or otherwise obtaining a weight of the trailer from a database (e.g., previously determined or previously measured for the respective trailer). Alternatively or additionally, in some embodiments, the weight determination of process block 404 can include measuring a weight of the trailer based at least in part on towing the trailer along a known or predetermined route, for example, to a different elevation. Alternatively or additionally, in some embodiments, the weight determination of process block 404 can include measuring a weight of the trailer based at least in part on towing the trailer with or without brakes applied, for example, by measuring an acceleration of the trailer in response to an applied force by the vehicle.

The method 400 can proceed to decision block 406, where it is determined which motive feature of the trailer is to be assessed. For example, if the brakes of the trailer are to be assessed, the method 400 can proceed from decision block 406 to process block 408, where the trailer brakes (e.g., service brakes, emergency brakes, or both) are engaged. In some embodiments, vehicle may control operation of the trailer brakes to engage, for example, via the respective gladhand couplers and/or the remote control unit. The engagement of the trailer brakes in process block 408 can be to any level from complete disengagement (e.g., 0% actuation level) to partial engagement to full engagement (e.g., 100% actuation level), inclusive. After engaging the brakes, the method 400 can proceed to process block 410. Alternatively, if features other than the brakes of the trailer are to be assessed (e.g., wear condition of ball bearings, inflation state of the tires, drag, etc.), the method 400 can proceed from decision block 406 directly to process block 410 (e.g., without any trailer brake actuation).

At process block 410, the vehicle can be actuated, for example, to tow or attempt to tow the trailer. In some embodiments, at a same time, a force applied to the trailer by the vehicle can be measured. In some embodiments, the force can be measured by one or more forces sensors of the vehicle and/or the trailer. For example, the force can be measured by a strain gauge mounted on or coupled to the fifth wheel of the vehicle. Alternatively or additionally, the force can be measured based at least in part on a power applied by one or more engines of the vehicle during the towing or attempted towing. Alternatively or additionally, in some embodiments, the acceleration of the trailer and/or the vehicle can be measured (e.g., deceleration rate).

The method 400 can proceed to decision block 412, where it is determined if the measurements, should be repeated, for example, to evaluate operation of the trailer brakes at a different brake actuation levels, to evaluate operation of the emergency brakes independent of the service brakes, or for any other reason. If the measurement is to be repeated, the method 400 can return to decision block 406 via optional process block 414, where the trailer brake actuation level can be changed.

Otherwise, the method 400 can proceed to process block 416, where the measured data can be correlated to assessment of one or more motive features of the trailer. For example, in some embodiments, the tractive effort of the vehicle applied to tow the tractor at different applied braking forces can be compared to provide an assessment of regulation and/or operation of the service brakes of the trailer. Alternatively or additionally, the tractive effort of the vehicle can be correlated to a wear condition of the ball bearings of the trailer (e.g., with more worn ball bearings requiring a greater tractive effort), an inflation condition of the tires of the trailer (e.g., with more deflated tires requiring a greater tractive effort), and/or drag of the trailer (e.g., with more drag requiring a greater tractive effort). In some embodiments, the correlation of process block 416 can include compiling the measured data in a data structure (e.g., a table of some or all of the measured data versus trailer brake actuation level) and/or building a trailer brake model. In some embodiments, the measured data can be used as input to a feed forward control algorithm, for example, which outputs an actuation level for the trailer brakes to achieve a desired braking performance.

The method 400 can proceed to process block 418, where the vehicle can tow the trailer. In some embodiments, in process block 418, the vehicle can tow the trailer as per normal, for example, where the assessment suggests that the trailer is in good working order. Alternatively, in process block 418, the vehicle can tow the trailer with enhanced safety precautions (e.g., reduced speed, enhanced braking, limited travel area, etc.), for example, where the assessment suggests that the brakes of the trailer may be defective or other repairs are required. Alternatively or additionally, the towing of process block 418 can use actuation levels for the trailer brakes determined by or based on the measurement correlation of process block 416.

Although blocks 402-418 of method 400 have been described as being performed once, in some embodiments, multiple repetitions of a particular process block may be employed before proceeding to the next decision block or process block. In addition, although blocks 402-418 of method 400 have been separately illustrated and described, in some embodiments, process blocks may be combined and performed together (simultaneously or sequentially). Moreover, although FIG. 4 illustrates a particular order for blocks 402-418, embodiments of the disclosed subject matter are not limited thereto. Indeed, in certain embodiments, the blocks may occur in a different order than illustrated or simultaneously with other blocks. In some embodiments, method 400 can include steps or other aspects not specifically illustrated in FIG. 4. Alternatively or additionally, in some embodiments, method 400 may comprise only some of blocks 402-418 of FIG. 4.

V. System Examples

Figure 5A:
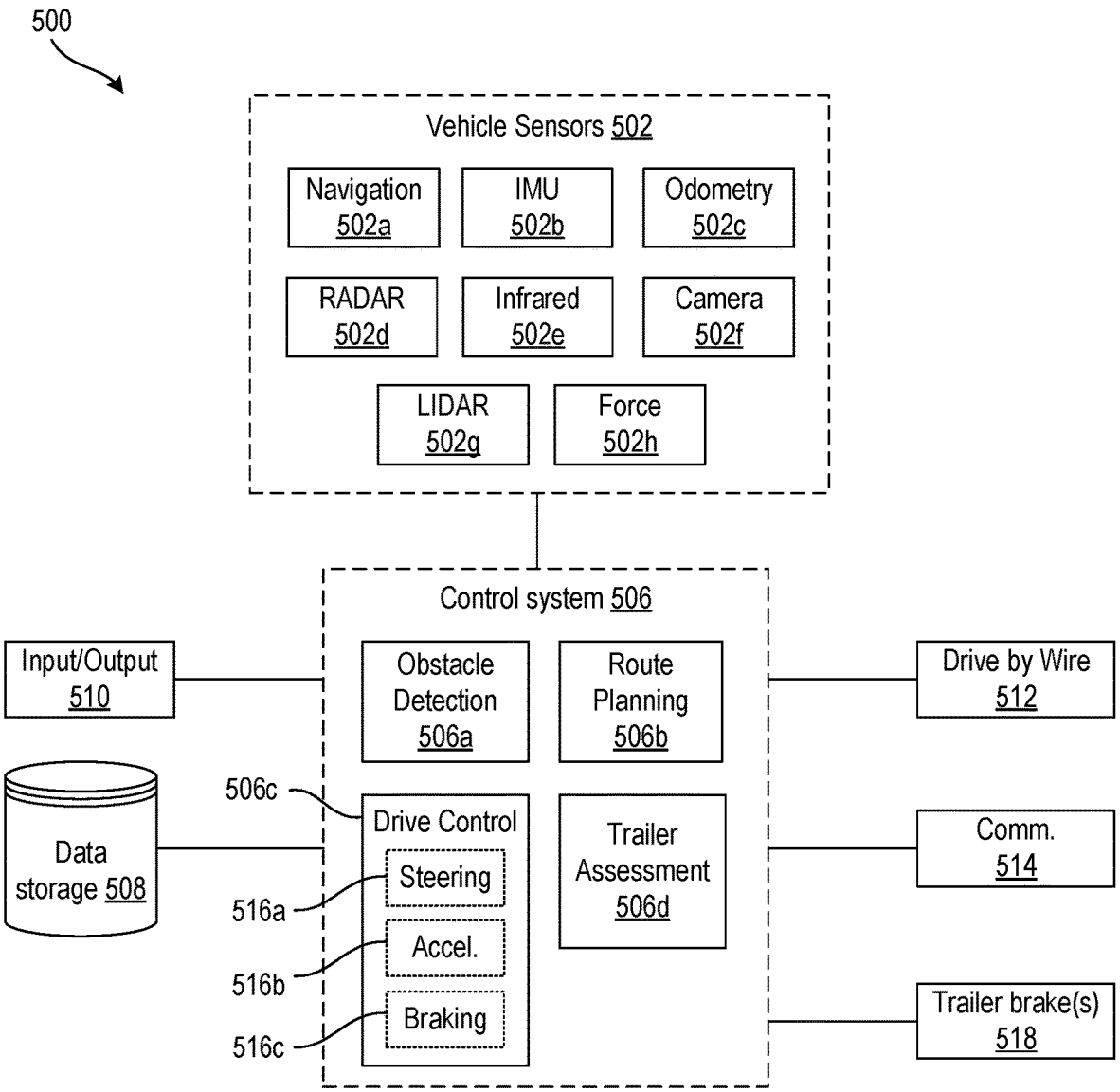
FIG. 5A is a simplified schematic diagram of an autonomous vehicle system with trailer assessment, according to one or more embodiments of the disclosed subject matter.

FIG. 5A illustrates an exemplary configuration of an autonomous vehicle system 500 for towing a trailer. The system 500 can include a vehicle control system 506, one or more vehicle sensors 502, a drive-by-wire system 512, and a communication unit 514. The drive-by-wire system 512 can include, for example, electrical and/or electro-mechanical components for performing one or more vehicle functions traditionally provided by mechanical linkages, e.g., braking, gearing, acceleration, and/or steering. In some embodiments, system 500 can further include one or more memories or databases. For example, system 500 can include one or more databases 508 that store driving rules (e.g., "rules of the road") and/or a road or terrain map of an area in which the vehicle operates. Alternatively or additionally, one or more databases 508 can store details regarding one or more trailers to which the vehicle may be coupled, for example, measured or approximated weights of the trailers, previously performed assessments (e.g., braking tables) of the trailers, etc.

In some embodiments, the vehicle sensors 502 can include a navigation sensor 502a, an inertial measurement unit (IMU) 502b, an odometry sensor 502c, a radio detection and ranging (RADAR) system 502d, an infrared (IR) imager 502e, a visual camera 502f, a light detection and ranging (LIDAR) system 502g, one or more force sensors 502h, or any combination thereof. Other sensors are also possible according to one or more contemplated embodiments. For example, sensors 502 can further include an ultrasonic or acoustic sensor for detecting distance or proximity to objects, a compass to measure heading, inclinometer to measure an inclination of a path traveled by the vehicle (e.g., to assess if the vehicle may be subject to slippage), ranging radios (e.g., as disclosed in U.S. Pat. No. 11,234,201, incorporated herein by reference), or any combination of the foregoing.

In some embodiments, the navigation sensor 502a can be used to determine relative or absolute position of the vehicle. For example, the navigation sensor 502a can comprise one or more global navigation satellite systems (GNSS), such as a global positioning system (GPS) device. In some embodiments, IMU 502b can be used to determine orientation or position of the vehicle. In some embodiments, the IMU 502b can comprise one or more gyroscopes or accelerometers, such as a microelectromechanical system (MEMS) gyroscope or MEMS accelerometer.

In some embodiments, the odometry sensor 502c can detect a change in position of the vehicle over time (e.g., distance). In some embodiments, odometry sensors 502c can be provided for one, some, or all of wheels of the vehicle, for example, to measure corresponding wheel speed, rotation, and/or revolutions per unit time, which measurements can then be correlated to change in position of the vehicle. For example, the odometry sensor 502c can include an encoder, a Hall effect sensor measuring speed, or any combination thereof.

In some embodiments, the RADAR system 502d can use irradiation with radio frequency waves to detect obstacles or features within an environment surrounding the vehicle. In some embodiment, the RADAR system 502d can be configured to detect a distance, position, and/or movement vector of a feature (e.g., obstacle) within the environment. For example, the RADAR system 502d can include a transmitter that generates electromagnetic waves (e.g., radio frequency or microwaves), and a receiver that detects electromagnetic waves reflected back from the environment.

In some embodiments, the IR sensor 502e can detect infrared radiation from an environment surrounding the vehicle. In some embodiments, the IR sensor 502e can detect obstacles or features in low-light level or dark conditions, for example, by including an IR light source (e.g., IR light-emitting diode (LED)) for illuminating the surrounding environment. Alternatively or additionally, in some embodiments, the IR sensor 502e can be configured to measure temperature based on detected IR radiation, for example, to assist in classifying a detected feature or obstacle as a person or vehicle.

In some embodiments, the camera sensor 502f can detect visible light radiation from the environment, for example, to determine features (e.g., obstacles) within the environment. Alternatively or additionally, the camera sensor 502f can be used to identify the trailer and/or measure features thereof (e.g., a size and/or estimated weight of the trailer). For example, the camera sensor 502f can include an imaging sensor array (e.g., a charge-coupled device (CCD) or complementary metal-oxide semiconductor (CMOS) sensor) and associated optical assembly for directing light onto a detection surface of the sensor array (e.g., lenses, filters, mirrors, etc.). In some embodiments, multiple camera sensors 502f can be provided in a stereo configuration, for example, to provide depth measurements.

In some embodiments, the LIDAR sensor system 502g can include an illumination light source (e.g., laser or laser diode), an optical assembly for directing light to/from the system (e.g., one or more static or moving mirrors (such as a rotating mirror), phased arrays, lens, filters, etc.), and a photodetector (e.g., a solid-state photodiode or photomultiplier). In some embodiments, the LIDAR sensor system 502g can use laser illumination to measure distances to obstacles or features within an environment surrounding the trailer. In some embodiments, the LIDAR sensor system 502g can be configured with a field-of-view primarily directed to detect features at the rear and/or sides of the trailer. Alternatively or additionally, in some embodiments, the LIDAR sensor system 502g can be used to identify the trailer and/or measure features thereof (e.g., a size and/or estimated weight of the trailer). Alternatively or additionally, in some embodiments, the LIDAR sensor system 502g can be configured to provide three-dimensional imaging data of the environment, and the imaging data can be processed (e.g., by the LIDAR system itself or by a module of control system 506) to generate a view of the environment (e.g., at least a 180-degree view, a 270-degree view, or a 360-degree view).

In some embodiments, the force sensor 502h can detect a force between the towing vehicle and the trailer. In some embodiments, the force sensor 502h (e.g., a pressure sensor or pressure plate) can detect a substantially vertical force between the vehicle and trailer, for example, to be used to determine or estimate a weight of the trailer. Alternatively or additionally, the force sensor 502h (e.g., a strain gauge) can detect a substantially horizontal force between the vehicle and the trailer, for example, to measure a towing force to be used to determine or estimate static resistance, rolling resistance, braking force, and/or weight of the trailer. Alternatively or additionally, in some embodiments, the force sensor 502h can measure a proxy for force applied by the towing vehicle, such as but not limited to acceleration (e.g., deceleration) and/or motor parameters (e.g., power and/or current input, power and/or torque output, RPM, etc.).

The vehicle sensors 502 can be operatively coupled to the control system 506, such that the control system 506 can receive data signals from the sensors 502 and control operation of the vehicle (e.g., vehicle 102) or components thereof (e.g., drive-by-wire system 512 and/or communication unit 04) and/or trailer (e.g., trailer 112) or components thereof (e.g., trailer braking system 518), responsively thereto. For example, FIG. 5A shows a configuration of a control system 506 that includes, in accordance with some embodiments, one or more modules, programs, software engines or processor instructions for performing at least some of the functionalities described herein. For example, control system 506 may comprise one or more software module(s) or engine(s) for directing one or more processors of system 500 to perform certain functions.

In some embodiments, software components, applications, routines or sub-routines, or sets of instructions for causing one or more processors to perform certain functions may be referred to as "modules" or "engines." It should be noted that such modules or engines, or any software or computer program referred to herein, may be written in any computer language and may be a portion of a monolithic code base, or may be developed in more discrete code portions, such as is typical in object-oriented computer languages. In addition, the modules or engines, or any software or computer program referred to herein, may in some embodiments be distributed across a plurality of computer platforms, servers, terminals, and the like. For example, a given module or engine may be implemented such that the described functions are performed by separate processors and/or computing hardware platforms. Further, although certain functionality may be described as being performed by a particular module or engine, such description should not be taken in a limiting fashion. In other embodiments, functionality described herein as being performed by a particular module or engine may instead (or additionally) be performed by a different module, engine, program, sub-routine or computing device without departing from the spirit and scope of the invention(s) described herein.

It should be understood that any of the software modules, engines, or computer programs illustrated herein may be part of a single program or integrated into various programs for controlling one or more processors of a computing device or system. Further, any of the software modules, engines, or computer programs illustrated herein may be stored in a compressed, uncompiled, and/or encrypted format and include instructions which, when performed by one or more processors, cause the one or more processors to operate in accordance with at least some of the methods described herein. Of course, additional and/or different software modules, engines, or computer programs may be included, and it should be understood that the examples illustrated and described with respect to FIG. 5A are not necessary in any embodiments. Use of the terms "module" or "software engine" is not intended to imply that the functionality described with reference thereto is embodied as a stand-alone or independently functioning program or application. While in some embodiments functionality described with respect to a particular module or engine may be independently functioning, in other embodiments such functionality is described with reference to a particular module or engine for ease or convenience of description only and such functionality may in fact be a part of, or integrated into, another module, engine, program, application, or set of instructions for directing a processor of a computing device.

In some embodiments, the instructions of any or all of the software modules, engines or programs described above may be read into a main memory from another computer-readable medium, such from a read-only memory (ROM) to random access memory (RAM). Execution of sequences of instructions in the software module(s) or program(s) can cause one or more processors to perform at least some of the processes or functionalities described herein. Alternatively or additionally, in some embodiments, hard-wired circuitry may be used in place of, or in combination with, software instructions for implementation of the processes or functionalities described herein. Thus, the embodiments described herein are not limited to any specific combination of hardware and software.

In the illustrated example of FIG. 5A, the control system 506 includes an obstacle detection module 506a, a route planning module 506b, a drive control module 506c, and/or a trailer assessment module 506d. For example, the drive control module 506c may have a steering control submodule 516a (e.g., for controlling steering of the vehicle via the drive-by-wire system 512), an acceleration control submodule 516b (e.g., for controlling a speed or acceleration of the vehicle via the drive-by-wire system 512, for example, by controlling a power and/or RPM of one or more motors of the vehicle), and/or a braking control submodule 516c (e.g., for actuating brakes of the vehicle via the drive-by-wire system 512 and/or trailer braking system 518). Other modules or components are also possible according to one or more contemplated embodiments.

In some embodiments, the route planning module 506b can be configured to plan a route for the vehicle to follow. In some embodiments, the route planning module 506b can employ data stored in database 508 regarding rules of the road and/or the road network or area to plan a route while avoiding known or detected obstacles in the environment. In some embodiments, the control system 506 can use signals from the sensors 502 to identify traversable paths through the area, for example, using vehicle position and/or features identified in the surrounding environment by one or more of sensors 502. In some embodiments, drive control module 506c can then control the drive-by-wire system 512 (e.g., an electrical or electro-mechanical system that controls steering, gearing, velocity, acceleration, and/or braking) and/or trailer braking system 518 to have the vehicle (e.g., with trailer coupled thereto) follow the planned route. Alternatively or additionally, in some embodiments, the control system 506 can control the drive-by-wire system 512 and/or trailer braking system 518 based one or more signals received via communication unit 514 (e.g., transceiver for wireless communication), for example, to follow another vehicle (e.g., autonomous or manually-operated leader vehicle). In some embodiments, the obstacle detection module 506a can be configured to detect obstacles (e.g., impassable road features, other vehicles, pedestrians, etc.) as the vehicle moves. Control system 506 can be further configured to avoid the detected obstacles, for example, by instructing the vehicle to follow an alternative path.

In some embodiments, the vehicle can communicate with other vehicles and/or a communication infrastructure (e.g., cellular network) via communication unit 514. Alternatively or additionally, the communication unit 514 can communicate instructions to and/or receive signals from a remote control unit coupled to the trailer, for example, to control braking operation thereof. In some embodiments, the communication unit employs a wireless communication modality, such as radio, ultra-wideband (UWB), Bluetooth, Wi-Fi, cellular, optical, or any other wireless communication modality.

In some embodiments, the trailer assessment module 506d can control actuation of the vehicle (e.g., via drive-by-wire system 512) and/or trailer braking system 518 (e.g., via connected gladhand couplers and/or a remote control unit) to perform an assessment of the trailer. For example, in some embodiments, the trailer assessment module 506d can instruct partial or full engagement of the brakes of the trailer while the vehicle tows (or attempts to tow) the trailer. The force applied by the vehicle to the trailer (e.g., as measured by force sensor 502h) can be correlated by the trailer assessment module 506d to the condition of one or more features of the trailer, such as, operability or regulation of the service brakes, operability of the emergency brakes, or both. Alternatively or additionally, the force applied by the vehicle to the trailer (with or without application of the trailer brakes) can be correlated by the trailer assessment module 506d to conditions of other features of the trailer, such as a wear condition of wheel ball bearings, inflation of the trailer tires, and/or drag.

In some embodiments, system 500 can optionally include a user interface 510, which can be configured to receive input from a human operator and/or provide feedback (e.g., tactile, visual, auditory, etc.) to a human operator regarding operation of the vehicle. For example, the input can comprise motion (e.g., rotation of a steering wheel, manipulation of a joystick, toggle of switch, etc.), audio (e.g., voice commands), or both. In some embodiments, the user interface 510 can be used to control operation of the vehicle or components thereof, for example, via respective modules of control system 506 and/or overriding commands issued by modules of control system 506. In some embodiments, the user interface 510 can be configured as a remote work station for teleoperation of the vehicle. Alternatively or additionally, user interface 510 can accept input from a human operator for assessment of a trailer.

Figure 5B:
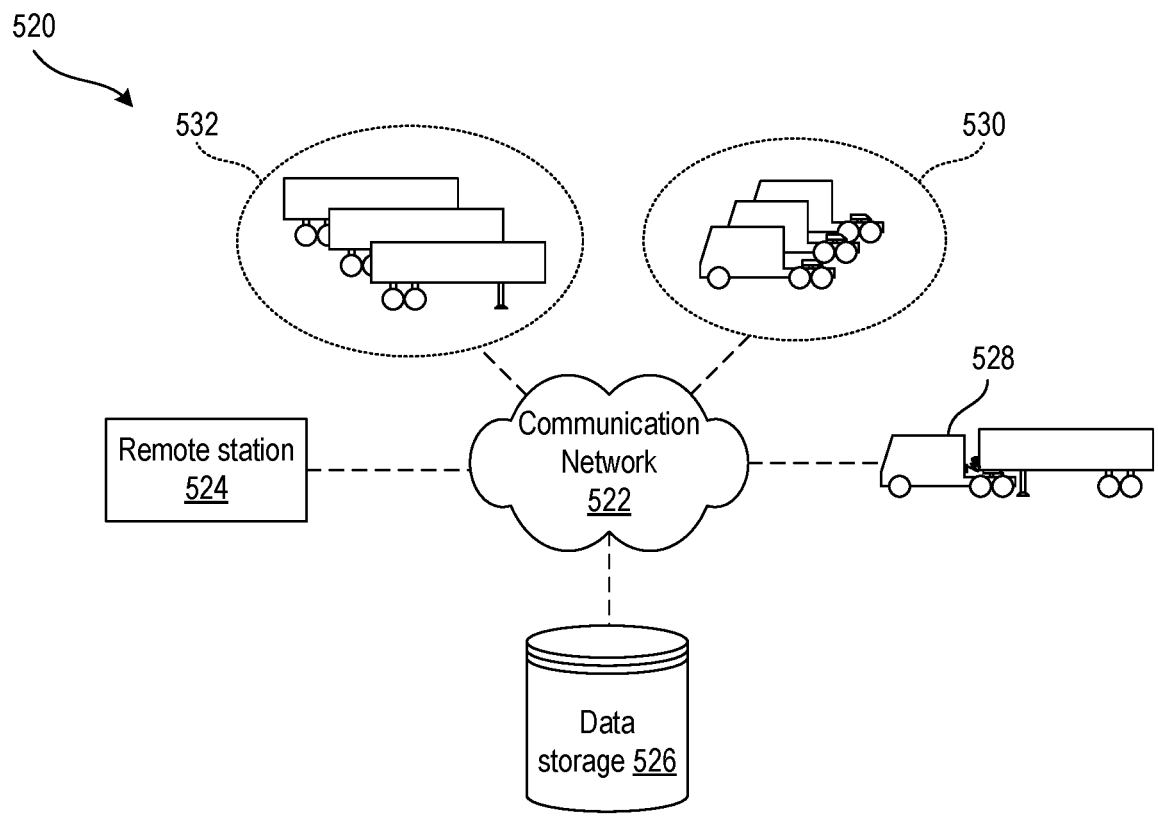
FIG. 5B illustrates aspects of a system configuration with a plurality of towing vehicles and trailers, according to one or more embodiments of the disclosed subject matter.

FIG. 5B illustrates an exemplary yard configuration 520 for moving of a plurality of trailers 532 using a plurality of vehicles 528, 530 (e.g., autonomous vehicles). In the illustrated example, the yard configuration 520 includes a remote station 524 (e.g., central control) that can communicate with the plurality of vehicles 528, 530 via a communication network 522 (e.g., cellular, radio, UWB, Wi-Fi, etc.). In some embodiments, the vehicles 528, 530 can also communicate with each other and/or the remote station 524 via communication network 522. Alternatively or additionally, trailers 532 can also communicate with the vehicles 528, 530 and/or the remote station 524 via communication network 522. In the illustrated example, the yard configuration 520 also includes a data storage device 526 (e.g., database). The remote station 524 can communicate with the data storage device 526 via the communication network 522. Alternatively, in some embodiments, the data storage device 526 can be co-located with the remote station 524 or otherwise configured to communicate with the remote station 524 without using communication network 522.

In some embodiments, the remote station 524 can control or instruct vehicles 528, 530, for example, to travel to and connect with a particular trailer 532, to move a particular trailer 532 to a desired location, to follow a particular path or proceed to a particular location (e.g., for recharge or repair of the vehicle, to measure or estimate trailer weight, to measure static resistance, rolling resistance, and/or acceleration of the trailer), or for any other purpose. In some embodiments, the remote station 524 can control or instruct vehicle 528 (or another vehicle 530 after coupling to one of the trailers 532) to perform an assessment of the trailer, for example, as described above with respect to any of FIG. 1A-4. Alternatively or additionally, in some embodiments, the remote station 524 can at least communicate with the vehicles to obtain information or data therefrom, for example, to receive data from an assessment of a trailer by vehicle 528 and/or an operational model (e.g., a trailer model and/or a trailer braking model). In some embodiments, the assessment data and/or operational model can be stored by the remote station (e.g., in data storage device 526) for later use, for example, by another vehicle 530 that is subsequently connected to the trailer (e.g., when the time since the assessment has been relatively short and/or cargo loading or other conditions of the trailer have not changed, such that the previously performed assessment can be assumed still valid).

VI. Computer Implementation

Figure 5C:
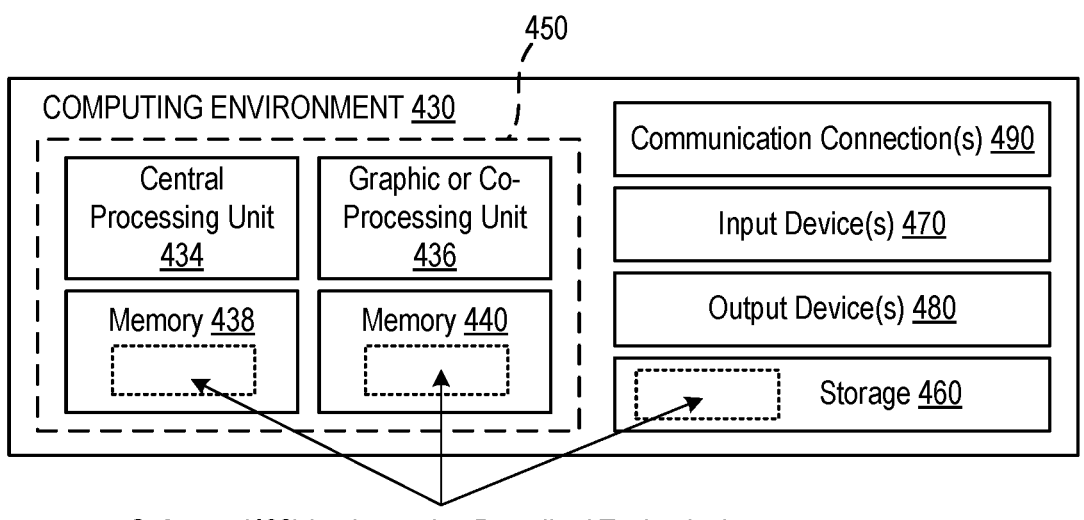
FIG. 5C depicts a generalized example of a computing environment in which the disclosed technologies may be implemented.

FIG. 5C depicts a generalized example of a suitable computing environment 430 in which the described innovations may be implemented, such as aspects of autonomous vehicle 102, control system 104, remote control unit 152, control system 202, method 400, and/or control system 506, etc. The computing environment 430 is not intended to suggest any limitation as to scope of use or functionality, as innovations may be implemented in diverse general-purpose or special-purpose computing systems. For example, computing environment 430 can be any of a variety of computing devices (e.g., desktop computer, laptop computer, server computer, tablet computer, etc.).

In the illustrated example, the computing environment 430 includes one or more processing units 434, 436 and one or more memories 438, 440, with this base configuration 450 included within a dashed line. The processing units 434, 436 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5C shows a central processing unit 434 as well as a graphics processing unit or co-processing unit 436. The tangible memory 438, 440 may be volatile memory (e.g., registers, cache, RAM), non-volatile memory (e.g., ROM, EEPROM, flash memory, etc.), or some combination of the two, accessible by the processing unit(s). The memory 438, 440 stores software 432 implementing one or more innovations described herein, in the form of computer-executable instructions suitable for execution by the processing unit(s).

A computing system may have additional features. For example, the computing environment 430 includes one or more storage 460, one or more input devices 470, one or more output devices 480, and one or more communication connections 490. An interconnection mechanism (not shown) such as a bus, controller, or network interconnects the components of the computing environment 430. In some embodiments, an operating system software (not shown) can provide an operating environment for other software executing in the computing environment 430 and can coordinate activities of the components of the computing environment 430.

The tangible storage 460 may be removable or non-removable, and includes magnetic disks, magnetic tapes or cassettes, CD-ROMs, DVDs, or any other medium which can be used to store information in a non-transitory way, and which can be accessed within the computing environment 430. The storage 460 can store instructions for the software 432 implementing one or more innovations described herein.

The input device(s) 470 may be a touch input device such as a keyboard, mouse, pen, or trackball, a voice input device, a scanning device, or another device that provides input to the computing environment 430. The output device(s) 470 may be a display, printer, speaker, CD-writer, or another device that provides output from computing environment 430.

The communication connection(s) 490 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Python, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

VII. Additional Examples of the Disclosed Technology

In view of the above-described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A control system comprising:
one or more processors; and
one or more non-transitory computer-readable media storing computer-readable instructions that, when executed by the one or more processors, cause the one or more processors to:

(a) measure static resistance and rolling resistance of a trailer without application of any braking force by service air brakes and emergency air brakes of the trailer;
(b) apply an actuation level to the service air brakes of the trailer while releasing the emergency air brakes of the trailer;
(c) during (b), measure static resistance, rolling resistance, and/or acceleration rate of the trailer; and
(d) determine an operational model for actuation of the service air brakes of the trailer based at least in part on the measured static resistances, rolling resistances, and/or acceleration rate.

Clause 2. The control system of any clause or example herein, in particular, Clause 1, wherein the one or more non-transitory computer-readable media store further instructions that, when executed by the one or more processors, cause the one or more processors to:
apply an actuation level to the service air brakes of the trailer in accordance with the operational model so as to cause a desired braking of the trailer.

Clause 3. The control system of any clause or example herein, in particular, any one of Clauses 1-2, wherein:
the one or more non-transitory computer-readable media store further instructions that, when executed by the one or more processors, cause the one or more processors to repeat (b) and (c) one or more times at different actuation levels; and
the determined operational model is further based on the measured static resistances, rolling resistances, and/or acceleration rates measured at the different actuation levels.

Clause 4. The control system of any clause or example herein, in particular, any one of Clauses 1-3, wherein the static resistance and rolling resistance measured in (a) provides an indication of wear conditions of ball bearings of the trailer and/or inflation levels of tires of the trailer.

Clause 5. The control system of any clause or example herein, in particular, any one of Clauses 1-4, the one or more non-transitory computer-readable media store further instructions that, when executed by the one or more processors, further cause the one or more processors to:
(e) activate the emergency air brakes of the trailer;
(f) during (e), measure static resistance of the trailer; and
(g) determine an operational state of the emergency air brakes of the trailer based at least in part on the static resistance measured in (f).

Clause 6. The control system of any clause or example herein, in particular, any one of Clauses 1-5, wherein the control system is configured to:
receive one or more signals from a force sensor on or proximal to a fifth-wheel coupling of a prime mover vehicle coupled to the trailer, the one or more signals being indicative of the static resistance and/or rolling resistance measured in (a);
receive one or more signals from the force sensor indicative of the static resistance and/or rolling resistance measured in (c); or
both of the above.

Clause 7. The control system of any clause or example herein, in particular, any one of Clauses 1-6, wherein the control system is configured to:
receive one or more signals from a motor of a prime mover vehicle coupled to the trailer, the one or more signals indicating an input power, an output power, an output torque, an input current, or revolutions per minute of the motor that corresponds to the static resistance and/or rolling resistance measured in (a);
receive one or more signals from the motor indicating an input power, an output power, an output torque, an input current, or revolutions per minute of the motor that corresponds to the static resistance and/or rolling resistance measured in (c); or
both of the above.

Clause 8. The control system of any clause or example herein, in particular, any one of Clauses 1-7, wherein the control system is mounted on or part of a prime mover vehicle coupled to the trailer.

Clause 9. The control system of any clause or example herein, in particular, Clause 8, further comprising:
a communications device configured to communicate with other vehicles and/or a remote system,
wherein the one or more non-transitory computer-readable media store further instructions that, when executed by the one or more processors, further cause the one or more processors to send the operational model, or data indicative thereof, to the other vehicles and/or the remote system via the communications device.

Clause 10. The control system of any clause or example herein, in particular, any one of Clauses 1-7, further comprising:
a communications device configured to communicate with a prime mover vehicle coupled to the trailer,
wherein the control system is remote from and in communication with the prime mover vehicle, and
the one or more non-transitory computer-readable media store further instructions that, when executed by the one or more processors, further cause the one or more processors to send the operational model, or data indicative thereof, to the prime mover vehicle via the communications device.

Clause 11. The control system of any clause or example herein, in particular, any one of Clauses 1-10, wherein:
the one or more non-transitory computer-readable media store further instructions that, when executed by the one or more processors, cause the one or more processors to determine or estimate a weight of the trailer; and
the operational model determined in (d) is also based on the determined or estimated weight.

Clause 12. The control system of any clause or example herein, in particular, Clause 11, wherein the control system is configured to estimate the weight of the trailer based on one or more signals received from a sensor on or proximal to a fifth-wheel coupling of a prime mover vehicle coupled to the trailer, the one or more signals being indicative of a force or pressure applied by the trailer to the fifth-wheel coupling.

Clause 13. The control system of any clause or example herein, in particular, any one of Clauses 11-12, wherein the control system is configured to estimate the weight of the trailer based on energy used by a prime mover vehicle in moving the trailer along a predetermined path with a known change in elevation.

Clause 14. The control system of any clause or example herein, in particular, any one of Clauses 11-13, wherein the control system is configured to determine the weight of the trailer by retrieving a previously measured value of the weight from a database.

Clause 15. An autonomous vehicle comprising the control system of any clause or example herein, in particular, any one of Clauses 1-9 and 11-14.

Clause 16. An autonomous vehicle, comprising:
   a fifth-wheel coupling configured to be coupled to a trailer;
   a drive-by-wire kit;
   one or more motors;
   one or more sensors configured to detect features in an environment surrounding the vehicle, forces applied to the vehicle, and/or forces applied to the trailer; and
   a vehicle control system operatively coupled to the drive-by-wire kit, the one or more motors, and the one or more sensors,
   wherein the vehicle control system comprises one or more processors and one or more non-transitory computer-readable media storing computer-readable instructions that, when executed by the one or more processors, cause the one or more processors to:
      (a) apply an actuation level to service air brakes of the trailer while releasing emergency air brakes of the trailer;
      (b) during (a), measure static resistance, rolling resistance, and/or acceleration rate of the trailer; and
      (c) determine an operational model for actuation of the service air brakes of the trailer based at least in part on the static resistance, rolling resistance, and/or acceleration rate measured during (b).

Clause 17. The autonomous vehicle of any clause or example herein, in particular, any one of Clauses 15-16, wherein the one or more non-transitory computer-readable media store further instructions that, when executed by the one or more processors, cause the one or more processors to autonomously move the vehicle and the trailer via the drive-by-wire kit and the one or motors.

Clause 18. The autonomous vehicle of any clause or example herein, in particular, any one of Clauses 15-17, further comprising:
   one or more gladhand connectors configured to be coupled with a corresponding gladhand receptacle for the service air brakes and/or the emergency air brakes of the trailer,
   wherein the actuation level is applied via the one or more gladhand connectors.

Clause 19. The autonomous vehicle of any clause or example herein, in particular, any one of Clauses 15-18, further comprising:
   one or more remote control units configured to be coupled with a corresponding gladhand receptacle for the service air brakes and/or the emergency air brakes of the trailer, each remote control unit being configured to generate and/or apply air pressure to the coupled gladhand receptacle in response to a signal received from the vehicle control system,
   wherein the actuation level is applied via the one or more remote control units.

Clause 20. The autonomous vehicle of any clause or example herein, in particular, any one of Clauses 15-19, wherein the one or more non-transitory computer-readable media store further instructions that, when executed by the one or more processors, cause the one or more processors to apply an actuation level to the service air brakes of the trailer in accordance with the operational model so as to cause a desired braking of the trailer.

Clause 21. The autonomous vehicle of any clause or example herein, in particular, any one of Clauses 15-20, wherein:
   the one or more non-transitory computer-readable media store further instructions that, when executed by the one or more processors, cause the one or more processors to measure static resistance and rolling resistance of the trailer without application of any braking force by the service air brakes and the emergency air brakes of the trailer; and
   the determined operational model is further based on the static resistance and rolling resistance measured without application of any braking force by the service air brakes and the emergency air brakes of the trailer.

Clause 22. The autonomous vehicle of any clause or example herein, in particular, Clause 21, wherein the static resistance and rolling resistance measured without application of any braking force by the service air brakes and the emergency air brakes of the trailer provides an indication of wear conditions of ball bearings of the trailer and/or inflation levels of tires of the trailer.

Clause 23. The autonomous vehicle of any clause or example herein, in particular, any one of Clauses 15-22, wherein:
   the one or more non-transitory computer-readable media store further instructions that, when executed by the one or more processors, cause the one or more processors to repeat (a) and (b) one or more times at different actuation levels; and
   the determined operational model is further based on the measured static resistance, rolling resistance, and/or acceleration rate measured at the different actuation levels.

Clause 24. The autonomous vehicle of any clause or example herein, in particular, any one of Clauses 15-23, the one or more non-transitory computer-readable media store further instructions that, when executed by the one or more processors, further cause the one or more processors to:
   (d) activate the emergency air brakes of the trailer;
   (e) during (d), measure static resistance of the trailer; and
   (f) determine an operational state of the emergency air brakes of the trailer based at least in part on the static resistance measured in (e).

Clause 25. The autonomous vehicle of any clause or example herein, in particular, any one of Clauses 15-24, wherein:
   the one or more sensors comprises a force sensor on or proximal to the fifth-wheel coupling; and
   the vehicle control system is configured to receive one or more signals from the force sensor indicative of the static resistance and/or rolling resistance measured in (b).

Clause 26. The autonomous vehicle of any clause or example herein, in particular, any one of Clauses 15-25, wherein the vehicle control system is configured to receive one or more signals indicative of an input power, an output power, an output torque, an input current, or revolutions per minute of the one or more motors that corresponds to the static resistance and/or rolling resistance measured in (b).

Clause 27. The autonomous vehicle of any clause or example herein, in particular, any one of Clauses 15-26, further comprising:
   a communications device configured to communicate with other vehicles and/or a remote system,
   wherein the one or more non-transitory computer-readable media store further instructions that, when executed by the one or more processors, further cause the one or more processors to send the operational model, or data indicative thereof, to the other vehicles and/or the remote system via the communications device.

Clause 28. The autonomous vehicle of any clause or example herein, in particular, any one of Clauses 15-27, wherein:
the one or more non-transitory computer-readable media store further instructions that, when executed by the one or more processors, cause the one or more processors to determine or estimate a weight of the trailer; and
the operational model determined in (c) is also based on the determined or estimated weight.

Clause 29. The autonomous vehicle of any clause or example herein, in particular, Clause 28, wherein the one or more sensors comprises a first sensor on or proximal to the fifth-wheel coupling, and the vehicle control system is configured to estimate the weight of the trailer based on one or more signals received from the first sensor indicative of a force or pressure applied by the trailer to the fifth-wheel coupling.

Clause 30. The autonomous vehicle of any clause or example herein, in particular, any one of Clauses 28-29, wherein the vehicle control system is configured to estimate the weight of the trailer based on energy used by the one or more motors in moving the trailer along a predetermined path with a known change in elevation.

Clause 31. The autonomous vehicle of any clause or example herein, in particular, any one of Clauses 28-30, wherein the vehicle control system is configured to determine the weight of the trailer by retrieving a previously measured value of the weight from a database.

Clause 32. A method for operating the control system of any clause or example herein, in particular, any one of Clauses 1-14.

Clause 33. A method of operating the autonomous vehicle of any clause or example herein, in particular, any one of Clauses 15-31.

Clause 34. A method comprising:
(a) applying an actuation level to service air brakes of a trailer while releasing emergency air brakes of the trailer;
(b) during (a), measuring static resistance, rolling resistance, and/or acceleration rate of the trailer;
(c) repeating (a) and (b) one or more times at different actuation levels; and
(d) determining an operational model for actuation of the service air brakes of the trailer based at least in part on the measured static resistances, rolling resistances, and/or acceleration rates.

Clause 35. The method of any clause or example herein, in particular, any one of Clauses 32-34, further comprising:
applying an actuation level to the service air brakes of the trailer in accordance with the operational model so as to cause a desired braking of the trailer.

Clause 36. The method of any clause or example herein, in particular, any one of Clauses 32-35, further comprising:
measuring static resistance and rolling resistance of the trailer without application of any braking force by the service air brakes and the emergency air brakes of the trailer,
wherein the determined operational model is further based on the static resistance and rolling resistance measured without application of any braking force by the service air brakes and the emergency air brakes of the trailer.

Clause 37. The method of any clause or example herein, in particular, Clause 36, further comprising determining a wear condition of ball bearings of the trailer and/or inflation levels of tires of the trailer based at least in part on the static resistance and rolling resistance measured without application of any braking force by the service air brakes and the emergency air brakes of the trailer.

Clause 38. The method of any clause or example herein, in particular, any one of Clauses 32-37, further comprising:
(e) activating the emergency air brakes of the trailer;
(f) during (e), measuring static resistance of the trailer; and
(g) determining an operational state of the emergency air brakes of the trailer based at least in part on the static resistance measured in (f).

Clause 39. The method of any clause or example herein, in particular, any one of Clauses 32-38, wherein the measuring static resistance and/or rolling resistance comprises measuring force applied between a prime mover vehicle and the trailer via a force sensor on or proximal to a fifth-wheel coupling of the prime mover vehicle.

Clause 40. The method of any clause or example herein, in particular, any one of Clauses 32-39, wherein the measuring static resistance and/or rolling resistance of (b) comprises receiving one or more signals indicative of an input power, an output power, an output torque, an input current, or revolutions per minute of a motor of a primer mover vehicle coupled to the trailer.

Clause 41. The method of any clause or example herein, in particular, any one of Clauses 32-40, further comprising sending, via a communications device, the operational model, or data indicative thereof, to a vehicle or a remote system.

Clause 42. The method of any clause or example herein, in particular, any one of Clauses 32-41, further comprising determining or estimating a weight of the trailer, wherein the operational model determined in (d) is also based on the determined or estimated weight.

Clause 43. The method of any clause or example herein, in particular, Clause 42, further comprising measuring a force or pressure applied by the trailer to a fifth-wheel coupling of a prime mover vehicle, wherein the estimated weight of the trailer is based on the measured force or pressure.

Clause 44. The method of any clause or example herein, in particular, any one of Clauses 42-43, further comprising determining energy used by a prime mover vehicle in moving the trailer along a predetermined path with a known change in elevation, wherein the estimated weight of the trailer is based on the determined energy.

Clause 45. The method of any clause or example herein, in particular, any one of Clauses 42-44, wherein the determining the weight of the trailer comprises retrieving a previously measured value of the weight from a database.

Clause 46. The method of any clause or example herein, in particular, any one of Clauses 32-45, further comprising moving a prime mover vehicle coupled to the trailer via a fifth-wheel coupling.

Clause 47. The method of any clause or example herein, in particular, any one of Clauses 32-46, wherein the actuation level is applied to the service air brakes of the trailer by air pressure supplied via a gladhand connector of a prime mover vehicle coupled to a gladhand receptacle of the trailer.

Clause 48. The method of any clause or example herein, in particular, any one of Clauses 32-46, wherein the actuation level is applied to the service air brakes of the trailer by air pressure regulated or generated via a remote control unit coupled to a gladhand receptacle of the trailer.

Clause 49. A system comprising:
an autonomous vehicle configured to control pneumatic brakes of and move a trailer, the autonomous vehicle comprising:

a fifth wheel configured to be coupled to the trailer;
a drive-by-wire kit configured to control movement of the vehicle;
one or more sensors mounted on the vehicle; and
a controller operatively coupled to the drive-by-wire kit and the one or more sensors, the controller comprising one or more processors and computer-readable media storing computer-readable instructions that, when executed by the one or more processors, cause the controller to:
measure force applied between the trailer and the autonomous vehicle during actuation by the autonomous vehicle; and
determine an operational state of one or more features of the trailer based at least in part on the measured force.

Clause 50. The system any clause or example herein, in particular, Clause 49, wherein the one or more features of the trailer include service brakes, emergency brakes, tires, ball bearings, or any combination of the foregoing.

Clause 51. The system of any clause or example herein, in particular, any one of Clauses 49-50, wherein the operational state includes a wear state of a ball bearing of the trailer, inflation level of a tire of the trailer, operability of service and/or emergency brakes of the trailer, braking capacity of service and/or emergency brakes of the trailer, health of service and/or emergency brakes of the trailer, correspondence of braking level by service and/or emergency brakes of the trailer to instructed braking level, or any combination of the foregoing.

Clause 52. The system of any clause or example herein, in particular, any one of Clauses 49-51, wherein:
the computer-readable media stores additional computer-readable instructions that, when executed by the one or more processors, further cause the controller to determine or estimate a weight of the trailer, and
the operational state of the one or more features of the trailer is based at least in part on the measured force and the determined or estimated weight of the trailer.

Clause 53. The system of any clause or example herein, in particular, any one of Clauses 49-52, wherein the computer-readable media stores additional computer-readable instructions that, when executed by the one or more processors, further cause the controller to engage service and/or emergency brakes of the trailer prior to measuring the force.

Clause 54. The system of any clause or example herein, in particular, any one of Clauses 49-53, wherein the actuation comprises moving the trailer via the autonomous vehicle.

Clause 55. The system of any clause or example herein, in particular, any one of Clauses 49-54, wherein the one or more sensors comprises a strain gauge coupled to the fifth wheel and configured to measure the forces applied between the trailer and the autonomous vehicle.

Clause 56. The system of any clause or example herein, in particular, any one of Clauses 49-55, wherein the force applied between the trailer and the autonomous vehicle is measured based on a signal from at least one of the one or more sensors, based on a power output form one or more engines of the autonomous vehicle, or based on any combination of the foregoing.

Clause 57. The system of any clause or example herein, in particular, any one of Clause 49-56, further comprising a remote control unit for coupling to a gladhand receptacle of the trailer and configured to control operation of service and/or emergency brakes of the trailer.

Clause 58. A method comprising measuring force applied between a trailer and a vehicle coupled to the trailer during actuation by the vehicle, and determining an operational state of one or more features of the trailer based at least in part on the measured force.

Clause 59. The method of any clause or example herein, in particular, Clause 58, wherein the one or more features of the trailer include service brakes, emergency brakes, tires, ball bearings, or any combination of the foregoing.

Clause 60. The method of any clause or example herein, in particular, any one of Clauses 58-59, wherein the operational state includes a wear state of a ball bearing of the trailer, inflation level of a tire of the trailer, operability of service and/or emergency brakes of the trailer, braking capacity of service and/or emergency brakes of the trailer, health of service and/or emergency brakes of the trailer, correspondence of braking level by service and/or emergency brakes of the trailer to instructed braking level, or any combination of the foregoing.

Clause 61. The method of any clause or example herein, in particular, any one of Clauses 58-60, further comprising determining or estimating a weight of the trailer, wherein the determining the operational state is based at least in part on the measured force and the determined or estimated weight.

Clause 62. The method of any clause or example herein, in particular, any one of Clauses 58-61, further comprising, prior to the measuring, engaging service and/or emergency brakes of the trailer.

Clause 63. The method of any clause or example herein, in particular, any one of Clauses 58-62, wherein the actuation comprises moving the trailer via the vehicle.

Clause 64. The method of any clause or example herein, in particular, any one of Clauses 58-63, wherein the measuring is via a strain gauge coupled to a fifth wheel of the vehicle, and the vehicle is coupled to the trailer via the fifth wheel.

Clause 65. The method of any clause or example herein, in particular, any one of Clauses 58-64, wherein the measuring is based on a signal from at least one sensor of the vehicle, based on a power output from one or more engines of the autonomous vehicle, or based on any combination of foregoing.

Clause 66. The method of any clause or example herein, in particular, any one of Clauses 58-65, further comprising operating, via a remote control unit coupled to a gladhand receptacle of the trailer, service and/or emergency brakes of the trailer.

Clause 67. The method of any clause or example herein, in particular, any one of Clauses 58-66, wherein the vehicle is configured as an autonomous vehicle.

VIII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended points of focus, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002@ published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required. Although a product may be described as including a plurality of components, aspects, qualities, characteristics and/or features, that does not indicate that all of the plurality are essential or required. Various other embodiments within the scope of the described invention(s) include other products that omit some or all of the described plurality. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise. Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A reference to "another embodiment" in describing an embodiment does not imply that the referenced embodiment is mutually exclusive with another embodiment (e.g., an embodiment described before the referenced embodiment), unless expressly specified otherwise.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including ten percent (10%) of that value are intended, unless explicitly stated otherwise.

Directions and other relative references may be used to facilitate discussion of the drawings and principles herein, but are not intended to be limiting. For example, certain terms may be used such as "inner," "outer", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same. Similarly, while the terms "horizontal" and "vertical" may be utilized herein, such terms may refer to any normal geometric planes regardless of their orientation with respect to true horizontal or vertical directions (e.g., with respect to the vector of gravitational acceleration).

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

The terms "including", "comprising" and variations thereof mean "including but not limited to", unless expressly specified otherwise. As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as ultra-wideband (UWB) radio, Bluetooth™, Wi-Fi, TDMA, CDMA, 3G, 4G, 4G LTE, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Embodiments of the disclosed subject matter can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

IX. Conclusion

Although particular vehicles, trailers, sensors, components, and configuration have been illustrated in the figures and discussed in detail herein, embodiments of the disclosed subject matter are not limited thereto. Indeed, one of ordinary skill in the art will readily appreciate that different vehicles (e.g., any vehicle where gladhand connections are used), trailers (e.g., tanker trailers, flat-bed trailer, reefer trailer, box trailer, etc.), sensors, components, or configurations can be selected and/or components added to provide the same effect. In practical implementations, embodiments may include additional components or other variations beyond those illustrated. Accordingly, embodiments of the disclosed subject matter are not limited to the particular vehicles, trailers, sensors, components, and configurations specifically illustrated and described herein.

Any of the features illustrated or described with respect to one of FIGS. 1A-5C and Clauses 1-67 can be combined with features illustrated or described with respect to any other of FIGS. 1A-5C and Clauses 1-67 to provide systems, methods, devices, and embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the present disclosure.

The invention claimed is:

1. A control system comprising:
   one or more processors; and
   one or more non-transitory computer-readable media storing computer-readable instructions that, when executed by the one or more processors, cause the one or more processors to:
   (a) measure static resistance and rolling resistance of a trailer without application of any braking force by service air brakes and emergency air brakes of the trailer;
   (b) apply an actuation level to the service air brakes of the trailer while releasing the emergency air brakes of the trailer;
   (c) during (b), measure static resistance, rolling resistance, and/or acceleration rate of the trailer; and
   (d) determine an operational model for actuation of the service air brakes of the trailer based at least in part on the measured static resistances, rolling resistances, and/or acceleration rate.

2. The control system of claim 1, wherein the one or more non-transitory computer-readable media store further instructions that, when executed by the one or more processors, cause the one or more processors to:
   apply an actuation level to the service air brakes of the trailer in accordance with the operational model so as to cause a desired braking of the trailer.

3. The control system of claim 1, wherein:
   the one or more non-transitory computer-readable media store further instructions that, when executed by the one or more processors, cause the one or more processors to repeat (b) and (c) one or more times at different actuation levels; and
   the determined operational model is further based on the measured static resistances, rolling resistances, and/or acceleration rates measured at the different actuation levels.

4. The control system of claim 1, wherein the control system is configured to:
  receive one or more signals from a force sensor on or proximal to a fifth-wheel coupling of a prime mover vehicle coupled to the trailer, the one or more signals being indicative of the static resistance and/or rolling resistance measured in (a);
  receive one or more signals from the force sensor indicative of the static resistance and/or rolling resistance measured in (c); or
  both of the above.

5. The control system of claim 1, wherein the control system is configured to:
  receive one or more signals from a motor of a prime mover vehicle coupled to the trailer, the one or more signals indicating an input power, an output power, an output torque, an input current, or revolutions per minute of the motor that corresponds to the static resistance and/or rolling resistance measured in (a);
  receive one or more signals from the motor indicating an input power, an output power, an output torque, an input current, or revolutions per minute of the motor that corresponds to the static resistance and/or rolling resistance measured in (c); or
  both of the above.

6. The control system of claim 1, wherein:
  the one or more non-transitory computer-readable media store further instructions that, when executed by the one or more processors, cause the one or more processors to determine or estimate a weight of the trailer; and
  the operational model determined in (d) is also based on the determined or estimated weight.

7. An autonomous vehicle, comprising:
  a fifth-wheel coupling configured to be coupled to a trailer;
  a drive-by-wire kit;
  one or more motors;
  one or more sensors configured to detect features in an environment surrounding the vehicle, forces applied to the vehicle, and/or forces applied to the trailer; and
  a vehicle control system operatively coupled to the drive-by-wire kit, the one or more motors, and the one or more sensors,
  wherein the vehicle control system comprises one or more processors and one or more non-transitory computer-readable media storing computer-readable instructions that, when executed by the one or more processors, cause the one or more processors to:
    (a) apply an actuation level to service air brakes of the trailer while releasing emergency air brakes of the trailer;
    (b) during (a), measure static resistance, rolling resistance, and/or acceleration rate of the trailer; and
    (c) determine an operational model for actuation of the service air brakes of the trailer based at least in part on the static resistance, rolling resistance, and/or acceleration rate measured in (b).

8. The autonomous vehicle of claim 7, wherein the one or more non-transitory computer-readable media store further instructions that, when executed by the one or more processors, cause the one or more processors to autonomously move the vehicle and the trailer via the drive-by-wire kit and the one or motors.

9. The autonomous vehicle of claim 7, wherein the one or more non-transitory computer-readable media store further instructions that, when executed by the one or more processors, cause the one or more processors to apply an actuation level to the service air brakes of the trailer in accordance with the operational model so as to cause a desired braking of the trailer.

10. The autonomous vehicle of claim 7, wherein:
  the one or more non-transitory computer-readable media store further instructions that, when executed by the one or more processors, cause the one or more processors to measure static resistance and rolling resistance of the trailer without application of any braking force by the service air brakes and the emergency air brakes of the trailer; and
  the determined operational model is further based on the static resistance and rolling resistance measured without application of any braking force by the service air brakes and the emergency air brakes of the trailer.

11. The autonomous vehicle of claim 7, wherein:
  the one or more non-transitory computer-readable media store further instructions that, when executed by the one or more processors, cause the one or more processors to repeat (a) and (b) one or more times at different actuation levels; and
  the determined operational model is further based on the measured static resistance, rolling resistance, and/or acceleration rate measured at the different actuation levels.

12. The autonomous vehicle of claim 7, wherein:
  the one or more sensors comprises a force sensor on or proximal to the fifth-wheel coupling; and the vehicle control system is configured to receive one or more signals from the force sensor indicative of the static resistance and/or rolling resistance measured in (b); or
  the vehicle control system is configured to receive one or more signals indicative of an input power, an output power, an output torque, an input current, or revolutions per minute of the one or more motors that corresponds to the static resistance and/or rolling resistance measured in (b).

13. The autonomous vehicle of claim 7, wherein:
  the one or more non-transitory computer-readable media store further instructions that, when executed by the one or more processors, cause the one or more processors to determine or estimate a weight of the trailer; and
  the operational model determined in (c) is also based on the determined or estimated weight.

14. A method comprising:
  (a) applying an actuation level to service air brakes of a trailer while releasing emergency air brakes of the trailer;
  (b) during (a), measuring static resistance, rolling resistance, and/or acceleration rate of the trailer;
  (c) repeating (a) and (b) one or more times at different actuation levels; and
  (d) determining an operational model for actuation of the service air brakes of the trailer based at least in part on the measured static resistances, rolling resistances, and/or acceleration rates.

15. The method of claim 14, further comprising:
  applying an actuation level to the service air brakes of the trailer in accordance with the operational model so as to cause a desired braking of the trailer.

16. The method of claim 14, further comprising:
  measuring static resistance and rolling resistance of the trailer without application of any braking force by the service air brakes and the emergency air brakes of the trailer,
  wherein the determined operational model is further based on the static resistance and rolling resistance measured without application of any braking force by the service air brakes and the emergency air brakes of the trailer.

17. The method of claim 16, further comprising determining a wear condition of ball bearings of the trailer and/or inflation levels of tires of the trailer based at least in part on the static resistance and rolling resistance measured without application of any braking force by the service air brakes and the emergency air brakes of the trailer.

18. The method of claim 14, further comprising:
(e) activating the emergency air brakes of the trailer;
(f) during (e), measuring static resistance of the trailer; and
(g) determining an operational state of the emergency air brakes of the trailer based at least in part on the static resistance measured in (f).

19. The method of claim 14, wherein the measuring static resistance and/or rolling resistance of (b) comprises:
measuring force applied between a prime mover vehicle and the trailer via a force sensor on or proximal to a fifth-wheel coupling of the prime mover vehicle; or
receiving one or more signals indicative of an input power, an output power, an output torque, an input current, or revolutions per minute of a motor of a primer mover vehicle coupled to the trailer.

20. The method of claim 14, further comprising:
determining or estimating a weight of the trailer,
wherein the operational model determined in (d) is also based on the determined or estimated weight.

* * * * *